(12) United States Patent
Yaita

(10) Patent No.: US 10,690,691 B2
(45) Date of Patent: Jun. 23, 2020

(54) AUTOMATIC ANALYZER AND COMPUTER-READABLE RECORDING MEDIUM STORING PROGRAM

(71) Applicant: JEOL Ltd., Tokyo (JP)

(72) Inventor: Tsuyoshi Yaita, Tokyo (JP)

(73) Assignee: JEOL Ltd., Tokyo (JP)

( * ) Notice: Subject to any disclaimer, the term of this patent is extended or adjusted under 35 U.S.C. 154(b) by 325 days.

(21) Appl. No.: 15/657,682

(22) Filed: Jul. 24, 2017

(65) Prior Publication Data

US 2018/0031591 A1 Feb. 1, 2018

(30) Foreign Application Priority Data

Jul. 27, 2016 (JP) .................. 2016-147032

(51) Int. Cl.
*G05D 9/00* (2006.01)
*G01N 35/10* (2006.01)
*G01F 23/26* (2006.01)

(52) U.S. Cl.
CPC ......... *G01N 35/1011* (2013.01); *G01F 23/26* (2013.01); *G01N 35/10* (2013.01); *G01F 23/263* (2013.01); *G01N 2035/1013* (2013.01); *G01N 2035/1025* (2013.01)

(58) Field of Classification Search
CPC .............. G01N 2035/1025; G01N 35/1011
USPC ................ 700/281, 283; 422/82.01
See application file for complete search history.

(56) References Cited

U.S. PATENT DOCUMENTS

| | | | |
|---|---|---|---|
| 4,977,786 A | * | 12/1990 | Davis .................. G01F 23/263 73/864.24 |
| 2008/0053216 A1 | | 3/2008 | Li et al. |
| 2010/0332158 A1 | | 12/2010 | Courtial et al. |
| 2012/0000296 A1 | | 1/2012 | Weng |

FOREIGN PATENT DOCUMENTS

| | | |
|---|---|---|
| JP | 10206432 A | 8/1998 |
| JP | 11271323 A | 10/1999 |
| JP | 200428673 A | 1/2004 |
| JP | 201194985 A | 5/2011 |

* cited by examiner

*Primary Examiner* — Natalia Levkovich
(74) *Attorney, Agent, or Firm* — The Webb Law Firm

(57) ABSTRACT

According to an aspect of the present invention, there is provided an automatic analyzer that detects a liquid level by using an electrostatic capacity system. Feature values are extracted from time-series oscillating frequency data of an alternating current signal that is output by an oscillation circuit in a period from a time point at which a dispensing probe starts moving downward till a time point at which a certain period of time has elapsed. On the basis of the feature values from the time-series oscillating frequency data, it is determined whether or not the liquid level in a container has been detected properly, by using different methods. Whether a gap is present between the tip portion of the dispensing probe and the liquid level in the container and a reason for the gap are determined from a combination of multiple determination results obtained by using the methods.

6 Claims, 22 Drawing Sheets

FIG. 6

| | FIRST DETERMINATION | SECOND DETERMINATION | THIRD DETERMINATION | FOURTH DETERMINATION | GAP DETERMINATION RESULT NORMAL OR ABNORMAL | FIRST CANDIDATE GAP REASON |
|---|---|---|---|---|---|---|
| PATTERN 0 | Pass | Pass | Pass | Pass | NORMAL | NOT APPLICABLE |
| PATTERN 1 | Pass | Pass | Pass | Fail | ABNORMAL | STATIC ELECTRICITY |
| PATTERN 2 | Pass | Pass | Fail | Pass | ABNORMAL | BUBBLE |
| PATTERN 3 | Pass | Pass | Fail | Fail | ABNORMAL | STATIC ELECTRICITY |
| PATTERN 4 | Pass | Fail | Pass | Pass | ABNORMAL | CONTACT |
| PATTERN 5 | Pass | Fail | Pass | Fail | ABNORMAL | UNKNOWN |
| PATTERN 6 | Pass | Fail | Fail | Pass | ABNORMAL | UNKNOWN |
| PATTERN 7 | Pass | Fail | Fail | Fail | ABNORMAL | UNKNOWN |
| PATTERN 8 | Fail | Pass | Pass | Pass | ABNORMAL | BUBBLE |
| PATTERN 9 | Fail | Pass | Pass | Fail | ABNORMAL | UNKNOWN |
| PATTERN 10 | Fail | Pass | Fail | Pass | ABNORMAL | BUBBLE |
| PATTERN 11 | Fail | Pass | Fail | Fail | ABNORMAL | STATIC ELECTRICITY |
| PATTERN 12 | Fail | Fail | Pass | Pass | ABNORMAL | CONTACT |
| PATTERN 13 | Fail | Fail | Pass | Fail | ABNORMAL | STATIC ELECTRICITY |
| PATTERN 14 | Fail | Fail | Fail | Pass | ABNORMAL | CONTACT |
| PATTERN 15 | Fail | Fail | Fail | Fail | ABNORMAL | STATIC ELECTRICITY |

FIG. 7

| DETERMINATION RESULT OF GAP REASON | RECOMMENDED COPING PROCEDURE DISPLAYED ON MONITOR |
|---|---|
| CONTACT | CHECK IF THE CONTAINER IS SET PROPERLY. IN THE CASE OF A LITTLE AMOUNT OF SAMPLE, TRANSFER THE SAMPLE TO A CONTAINER OF SMALLER CAPACITY. |
| BUBBLE | REMOVE BUBBLES ON THE SAMPLE SURFACE. |
| STATIC ELECTRICITY | WIPE THE SAMPLE CONTAINER WITH A WET CLOTH. |
| UNKNOWN | CHECK IF CONTACT, BUBBLES, OR STATIC ELECTRICITY IS PRODUCED. |

FIG. 11
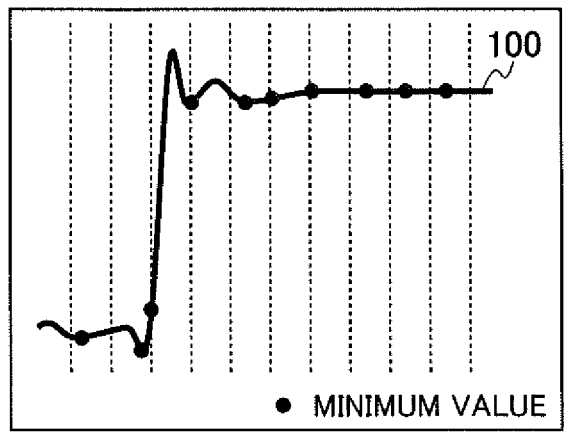
100
• MINIMUM VALUE
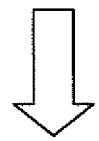
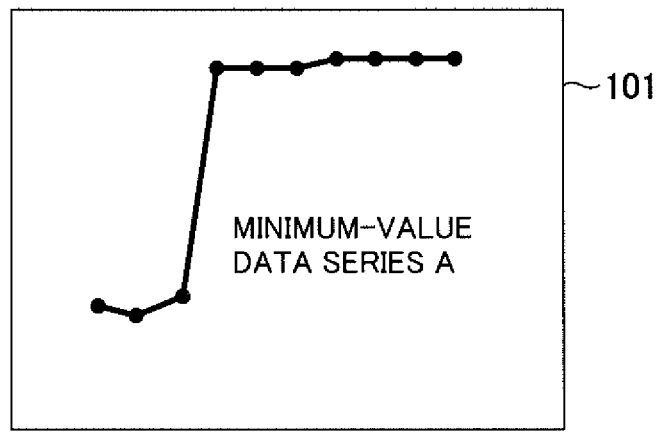
101
MINIMUM-VALUE DATA SERIES A
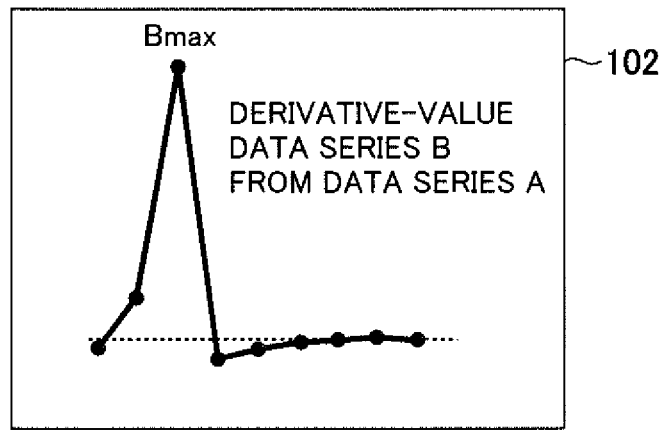
102
Bmax
DERIVATIVE-VALUE DATA SERIES B FROM DATA SERIES A FIG. 15
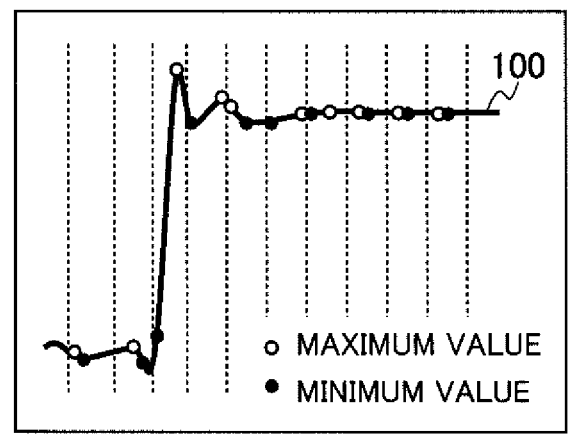
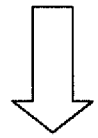
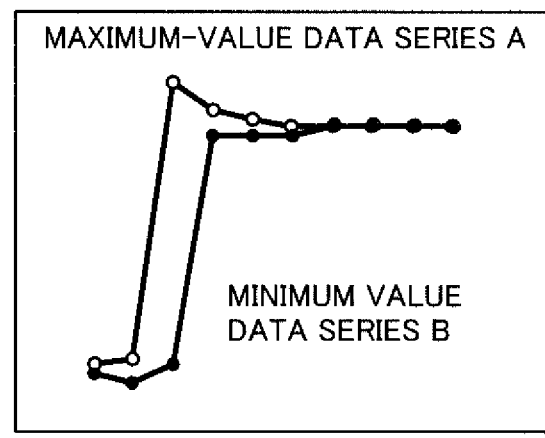
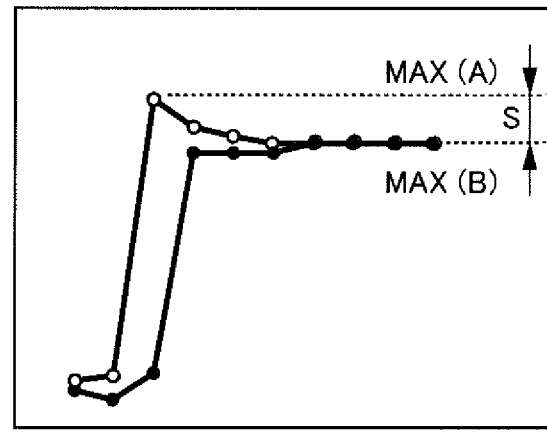

FIG. 20
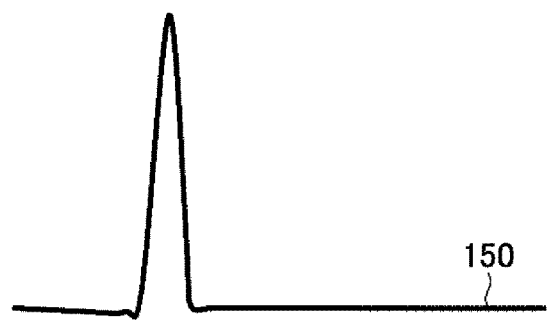
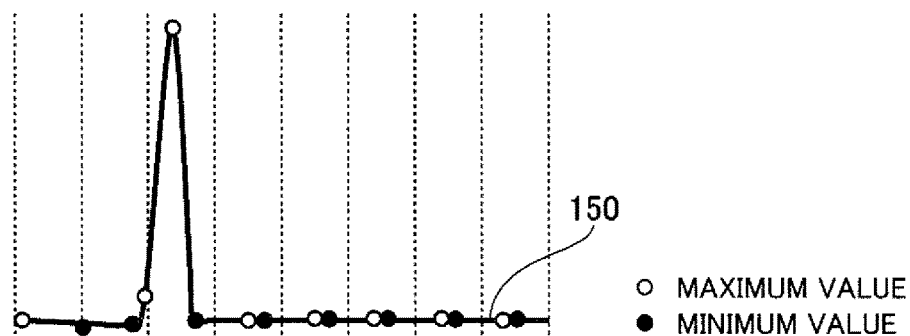
○ MAXIMUM VALUE
● MINIMUM VALUE
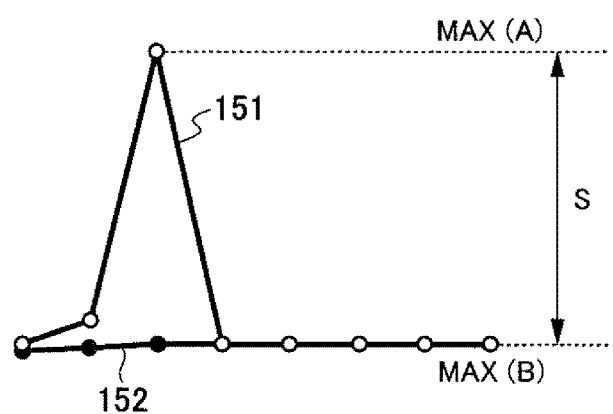

AUTOMATIC ANALYZER AND COMPUTER-READABLE RECORDING MEDIUM STORING PROGRAM

BACKGROUND OF THE INVENTION

1. Field of the Invention

The present invention relates to an automatic analyzer and a computer-readable recording medium storing programs, and particularly to a technique of detecting that a tip portion of a dispensing probe detects the surface (hereinafter referred to as a "liquid level") of liquid in a container erroneously.

2. Description of the Related Art

Automatic analyzers for clinical tests are used in tests in various fields, such as biochemical tests, immunological tests, and blood transfusion tests. In such an automatic analyzer, a container for storing a sample or a reagent is disposed at a predetermined position on the apparatus. The automatic analyzer suctions liquid (a sample or a reagent) in the container by using a dispensing mechanism including a dispensing probe and a pump connected to the dispensing probe, conveys the suctioned liquid while holding it, and ejects the liquid into a target container (such as a reaction container).

In the dispensing mechanism, to avoid contamination of the dispensing probe and the liquid, it is desirable that the dispensing probe stop at the liquid level. A typical method which is currently being used and in which the position of a liquid level is detected is an electrostatic capacity system method.

In an electrostatic capacity system, the electrostatic capacity between the suction unit (tip portion) of a dispensing probe and a surrounding portion (for example, the ground of the apparatus housing) is monitored, and a change in the electrostatic capacity is detected. When the tip portion of the dispensing probe touches liquid such as a sample, the electrostatic capacity value changes. Therefore, detection of the change using a threshold or the like enables determination of whether the dispensing probe is in contact with the liquid level or in the air. In a normal case, the electrostatic capacity is monitored when the dispensing probe moves downward to the container. When the electrostatic capacity changes to a large extent so as to exceed the threshold, the moving-downward operation of the dispensing probe is stopped at that time point. Thus, the dispensing probe is held in a state in which only the tip portion of the dispensing probe touches the liquid level.

As an exemplary electrostatic capacity system, for example, a method (see Japanese Unexamined Patent Application Publication No. 11-271323) and many similar or associated methods (for example, see Japanese Unexamined Patent Application Publications No. 10-206432, No. 2011-094985, and No. 2004-028673) have been devised. In the method described in Japanese Unexamined Patent Application Publication No. 11-271323, a capacitor-resistor (CR) oscillation circuit is formed, and change in the oscillating frequency is used to detect change in an electrostatic capacity C.

A technical problem about detection of a liquid level using an electrostatic capacity system of the related art is an event (hereinafter referred to as "a gap from a liquid level") in which, regardless of presence of a gap between the liquid level of a sample or the like and the tip of a dispensing probe, it is determined that the tip of the dispensing probe has reached the liquid level. At that time, since the dispensing probe is in the air, the dispensing probe fails to suction the target sample. Therefore, there may be a risk of erroneously reporting a value around zero as the concentration of a target constituent in the target sample. The main reasons of erroneous detection of a liquid level are listed below.

(A) Contact between a dispensing probe and the interior wall of a container
(B) Bubbles formed on a liquid surface
(C) Static electricity accumulated on the surface of a container (A) A typical container holding a sample or a reagent is made from a nonconductive material such as resin. The container is designed so that, even when a dispensing probe approaches the interior wall of the container, the electrostatic capacity will not increase. However, most of biological samples or test reagents contain an electrolyte constituent, therefore exhibiting conductivity. Hence, even in the case of a nonconductive resin container, conductive liquid is attached to the interior wall when the amount of liquid has been decreased due to its consumption after the container had been fully filled with the sample. In this case, a state in which the dispensing probe comes into contact with or approaches the interior wall of the container causes a change in the electrostatic capacity between the dispensing probe and the surrounding portion. When the dispensing probe comes into contact with or approaches the wall of the container first, rather than the sample, the electrostatic capacity increases due to misplacement of a blood-collecting vessel or a reagent bottle, an insufficient amount of sample, or the like, and it may be erroneously determined that the liquid level has been detected.

For example, an analyzer described in Japanese Unexamined Patent Application Publication No. 10-206432 has a configuration in which, in order to prevent erroneous detection caused by static electricity, a liquid-level detection circuit does not use, in calculation, an unexpected flow of electric charge as a detection signal. An automatic analyzer described in Japanese Unexamined Patent Application Publication No. 2004-028673 is provided with a function of determining that bubbles have been detected when the distance of the liquid level from a reference position is not changed before and after a suction operation. An automatic analyzer described in Japanese Unexamined Patent Application Publication No. 2011-094985 has the following mechanism: information about the height of a liquid level which is obtained from the amount of movement of a dispensing probe is stored; when the liquid level is detected at a position above the previous value, the dispensing probe continues to move; and the dispensing probe stops on the basis of the stored height. However, the methods described in Japanese Unexamined Patent Application Publications No. 10-206432, No. 2011-094985, and No. 2004-028673 are not effective in measures against erroneous detection caused by an increase in the electrostatic capacity which is caused when a dispensing probe comes into contact with the interior wall of a container.

(B) The problem caused by bubbles is that a dispensing probe stops at a time point at which the dispensing probe touches the surface of bubbles on liquid. Air is in the bubbles, and the dispensing probe suctions the air. The techniques described in Japanese Unexamined Patent Application Publications No. 2011-094985 and No. 2004-028673 are somewhat effective in detection of bubbles because determination is made on the basis the height at which the liquid level has been detected. However, there may be various changes in a bubble condition produced when bubbles come into contact with the dispensing probe, and the resulting changes in the electrostatic capacity may be various. Therefore, determination based on information about the height may be inaccurate.

(C) The problem caused by static electricity is as follows. When a dispensing probe approaches a container, static electricity (electric charge) accumulated on the surface of the container is discharged so as to flow into the dispensing probe. Thus, the electrostatic capacity increases falsely, and the change exceeds a threshold, causing the dispensing probe to stop. An electrostatic capacity is obtained as the amount of electric charge between two metals. Therefore, a change in electric charge affects the electrostatic capacity value directly. To address this issue, the technique described in Japanese Unexamined Patent Application Publication No. 10-206432 is effective as a method of preventing erroneous detection caused by static electricity. However, the technique is not a method of determining whether or not the erroneous detection has occurred due to static electricity. Even with a mechanism for dissipating a flow of static electricity, once static electricity flows in, a risk of erroneous detection of a liquid level may be high. Therefore, a user is to test the target sample again. To do this, a method of notifying a user of a risk of erroneous detection caused by a flow of static electricity is necessary.

In the related art, it is not assumed that gaps from the liquid level which are caused by the reasons, (A) contact between a dispensing probe and the interior wall of a container, (B) bubbles formed on a liquid surface, and (C) static electricity accumulated on the surface of a container, are discriminated from one another. According to the techniques of the related art, it is impossible to discriminate these reasons from one another. For example, in the methods in which determination is made on the basis of the height of a liquid level and which are described in Japanese Unexamined Patent Application Publications No. 2011-094985 and No. 2004-028673, possibility of erroneous detection caused by a reason other than bubbles may not be denied, and it may be unsuitable for transmitting a notification that the reason of the erroneous detection is bubbles. When a user is notified that a gap from the liquid level of some sample may be present, since there are multiple reasons, it is difficult for a user to determine how to cope with the gap. When a sample from which an abnormal result may be obtained is to be tested again, a state in which it takes time to make the determination leads to delay of the test. This finally results in loss of benefit of a patient who waits for the test result.

SUMMARY OF THE INVENTION

The present invention is made in consideration of the above-described issues, and provides a technique that enables erroneous detection of the liquid level in a container to be determined with high accuracy.

According to an aspect of the present invention, there is provided an automatic analyzer including a dispensing unit, an oscillation circuit, a detection unit, and a first controller. The dispensing unit has a dispensing probe. The dispensing unit moves a tip portion of the dispensing probe to a liquid level in a container, and suctions and ejects liquid. The oscillation circuit is connected to the dispensing probe. The oscillation circuit outputs an alternating current signal indicating oscillating frequency according to an electrostatic capacity. The electrostatic capacity is produced between the tip portion of the dispensing probe and a surrounding portion. The detection unit detects whether or not the tip portion of the dispensing probe comes into contact with the liquid level in the container, on the basis of the oscillating frequency of the alternating current signal which is output from the oscillation circuit. The first controller controls an operation of the dispensing unit on the basis of a detection result from the detection unit. The automatic analyzer further includes a feature-value extracting unit, a plurality of different determination processors, and a second controller. The feature-value extracting unit extracts feature values from time-series oscillating frequency data of the alternating current signal. The alternating current signal is output by the oscillation circuit in a period from a time point at which the dispensing probe starts moving downward to a time point at which a certain period of time has elapsed. The plurality of different determination processors determine whether or not the liquid level in the container is detected properly on the basis of the feature values of the time-series oscillating frequency data. The feature values are extracted by the feature-value extracting unit. The second controller determines whether a gap is present and a reason for the gap from a combination of determination results from the plurality of determination processors. The gap is present between the tip portion of the dispensing probe and the liquid level in the container.

According to at least one aspect of the present invention, erroneous detection of the liquid level in a container may be determined with higher accuracy on the basis of a combination of determination results from multiple determination processors that determine whether or not detection of the liquid level in the container has been performed properly.

Issues, configurations, and effects other than those described above will be clear through description of embodiments which is made below.

BRIEF DESCRIPTION OF THE DRAWINGS

FIG. 6 is an exemplary table illustrating combinations of determination results that are obtained from first to fourth determination processes and a gap reason.

FIG. 7 is an exemplary table for recommended coping procedures corresponding to gap-reason determination results.

FIG. 11 is a diagram illustrating images in processing on an electrostatic capacity waveform.

FIG. 15 is a diagram illustrating images in processing on an electrostatic capacity waveform.

FIG. 20 is a diagram for describing an abnormal waveform and data processing on the abnormal waveform.

DESCRIPTION OF THE PREFERRED EMBODIMENTS

Figure 1:
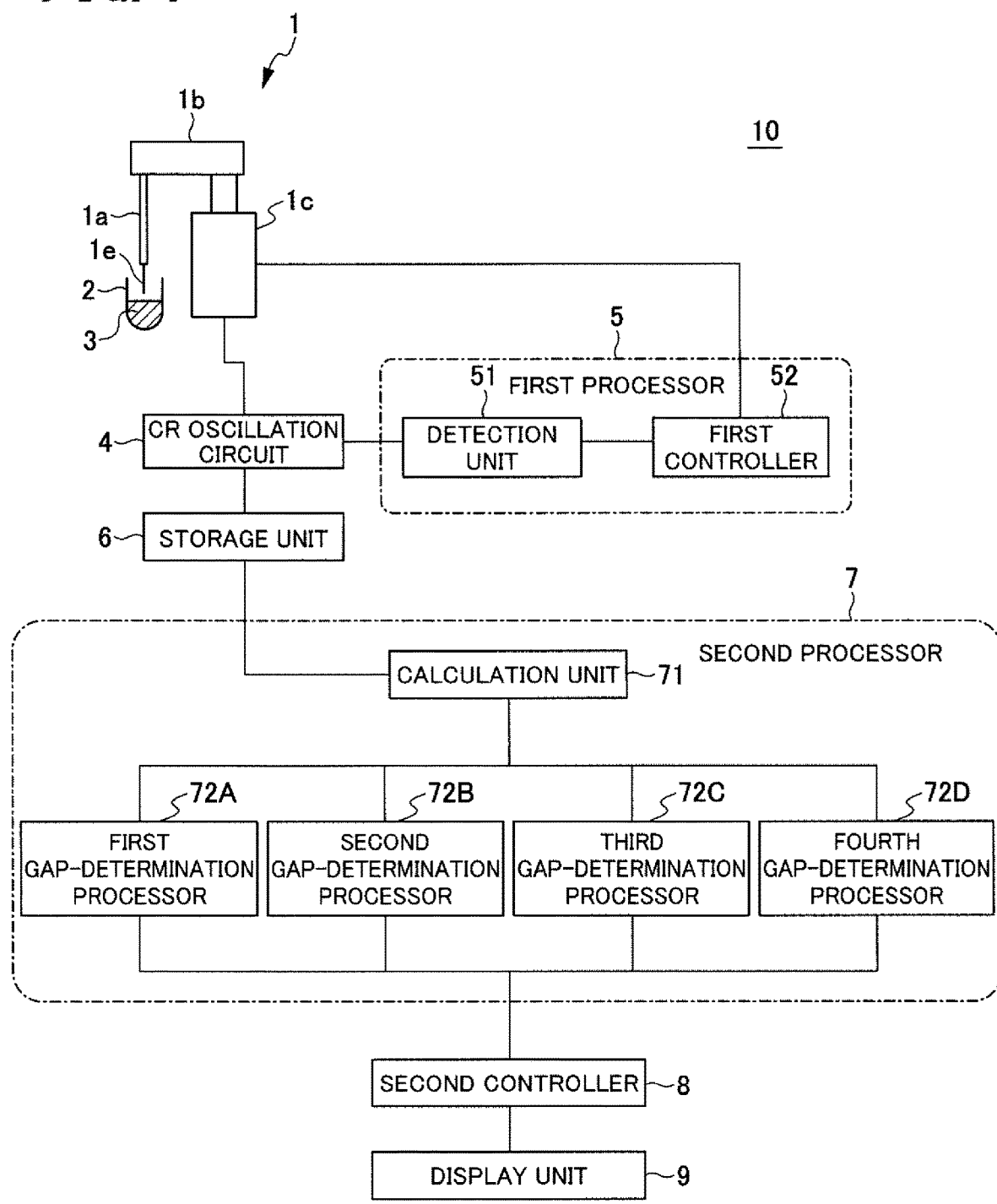
FIG. 1 is a block diagram illustrating an exemplary configuration of an automatic analyzer according to an embodiment of the present invention.

Exemplary embodiments of the present invention will be described below with reference to the attached drawings. In the figures, components having substantially the same functions or configurations are designated with identical reference numerals, and repeated description will be avoided.

First Embodiment

The Overall Configuration of an Automatic Analyzer

FIG. 1 is a block diagram illustrating an exemplary configuration of an automatic analyzer according to a first embodiment.

An automatic analyzer 10 according to the first embodiment has a mechanism in which the electrostatic capacity between a dispensing probe that dispenses liquid, such as a sample or a reagent, and a surrounding portion is monitored. A change in the electrostatic capacity value which is produced when the tip of the dispensing probe comes into contact with a liquid level is detected. Accordingly, the liquid level is detected.

As illustrated in FIG. 1, the automatic analyzer 10 includes a dispensing unit 1, a capacitor-resistor (CR) oscillation circuit 4, a first processor 5, a storage unit 6, a second processor 7, a second controller 8, and a display unit 9.

The dispensing unit 1 (exemplary dispensing unit) includes a dispensing probe 1a, an arm 1b that holds the dispensing probe 1a, and a driving mechanism 1c that drives the arm 1b. The dispensing probe 1a is formed of a conductive member such as metal, and is hollow so that sucked liquid is accommodated. The outer periphery of the dispensing probe 1a is protected by using a shield except a tip portion 1e (suction unit) through which liquid is sucked and ejected.

The dispensing unit 1 uses the driving mechanism 1c and the arm 1b to enable the dispensing probe 1a to move horizontally and vertically and perform suction and ejection operations. The driving mechanism 1c has, for example, a motor for driving the arm 1b. The dispensing unit 1 uses the driving mechanism 1c and the arm 1b to move the tip portion 1e of the dispensing probe 1a to the liquid level of a sample 3 (exemplary liquid) in a container 2, and suck the sample 3. Then, the dispensing unit 1 conveys the dispensing probe 1a having the sucked sample 3, to a target position (such as a reaction container), and causes the sample 3 to be ejected.

These operations of the dispensing unit 1 are controlled by the first processor 5 (a first controller 52). The dispensing probe 1a is connected to the CR oscillation circuit 4 and the first processor 5.

The container 2 is conveyed in a state in which a holding member such as a turntable holds the container 2. The holding member is electrically connected to the ground of a housing (hereinafter referred to as an "apparatus housing") of the automatic analyzer 10.

The CR oscillation circuit 4 (exemplary oscillation circuit) is a feedback oscillation circuit that feeds back by using a CR circuit including a resistor (R) and a capacitor (C), and generates an alternating current signal with sine waves. The CR oscillation circuit 4 outputs an alternating current signal indicating oscillating frequency according to the electrostatic capacity between the tip portion 1e of the dispensing probe 1a and the surrounding portion (for example, the holding member, that is, the ground of the apparatus housing). The CR oscillation circuit 4 has an analog-digital conversion circuit (not illustrated), and outputs a digital alternating current signal. As an oscillation circuit, other than a CR oscillation circuit, other various oscillation circuits such as an inductor-capacitor (LC) oscillation circuit may be applied.

The first processor 5, including a detection unit 51 and the first controller 52, analyzes an alternating current signal that is output from the CR oscillation circuit 4 and controls the dispensing unit 1 on the basis of the analysis result.

The detection unit 51 is connected to the CR oscillation circuit 4, and monitors the oscillating frequency of an alternating current signal that is output from the CR oscillation circuit 4. That is, the detection unit 51 obtains the alternating current signal, and detects the oscillating frequency of the alternating current signal at given sampling intervals. The detection unit 51 detects whether or not the tip portion 1e of the dispensing probe 1a has come into contact with the liquid level in the container 2, on the basis of the detected oscillating frequency. When the liquid level is detected, the detection unit 51 outputs a signal indicating detection of the liquid level.

The first controller 52 (a first controller) outputs a control signal to the driving mechanism 1c of the dispensing unit 1 on the basis of the detection result from the detection unit 51, and controls operations of the dispensing probe 1a.

The storage unit 6 stores data about a digital alternating current signal that is output from the CR oscillation circuit 4 during a period from a time point at which the dispensing probe 1a starts moving downward to a time point at which a certain period of time has elapsed.

The second processor 7 detects whether or not the first processor 5 detects a liquid level erroneously. The second processor 7 includes a calculation unit 71, a first gap-from-liquid-level determination processor 72A (hereinafter referred to as a "first gap-determination processor 72A"), a second gap-from-liquid-level determination processor 72B (hereinafter referred to as a "second gap-determination processor 72B"), a third gap-from-liquid-level determination processor 72C (hereinafter referred to as a "third gap-determination processor 72C"), and a fourth gap-from-liquid-level determination processor 72D (hereinafter referred to as a "fourth gap-determination processor 72D").

The calculation unit 71 (an exemplary feature-value extracting unit) obtains time-series oscillating frequency data (corresponding to an electrostatic capacity waveform) of an alternating current signal, from the alternating current signal data stored in the storage unit 6, and extracts feature values from the time-series oscillating frequency data. For example, a feature value is extracted for each regular section of the time-series oscillating frequency data.

The first gap-determination processor 72A to the fourth gap-determination processor 72D determine whether or not the liquid level in the container 2 has been detected properly, on the basis of the feature values of the time-series oscillating frequency data which are extracted by the calculation unit 71. An overview of operations of the first gap-determination processor 72A to the fourth gap-determination processor 72D will be described below. A detailed description will be made with reference to FIGS. 8, 10, 12, and 14.

The first gap-determination processor 72A (an exemplary first determination processor) calculates a derivative value of the feature value (for example, the minimum value) in each regular section of the time-series oscillating frequency data. Then, the first gap-determination processor 72A calculates a cross correlation between the waveform of a derivative-value data series and a corresponding normal waveform, determines, from the calculation result, whether or not the liquid level has been detected properly, and outputs the determination result to the second controller 8. The first gap-determination processor 72A checks changes in the waveform (electrostatic capacity waveform) formed by the time-series oscillating frequency data.

The second gap-determination processor 72B (an exemplary second determination processor) calculates a derivative value of the feature value (for example, the minimum value) in each regular section of the time-series oscillating frequency data. Then, the second gap-determination processor 72B compares the maximum value in the derivative-value data series with a threshold, determines, from the comparison result, whether or not the liquid level has been detected properly, and outputs the determination result to the second controller 8. The second gap-determination processor 72B checks the magnitude (steepness) of a change in the waveform (electrostatic capacity waveform) formed by the time-series oscillating frequency data.

The third gap-determination processor 72C (an exemplary third determination processor) obtains, through calculation, a section for feature values (for example, minimum values) that satisfy a predetermined condition and that are extracted for regular sections from the time-series oscillating frequency data. Then, the third gap-determination processor 72C compares the length of the section with a threshold, determines, from the comparison result, whether or not the liquid level has been detected properly, and outputs the determination result to the second controller 8. The third gap-determination processor 72C checks the shape of the waveform (electrostatic capacity waveform) formed by the time-series oscillating frequency data.

The fourth gap-determination processor 72D (an exemplary fourth determination processor) calculates the maximum value of a maximum-value data series and the maximum value of a minimum-value data series. The maximum-value data series and the minimum-value data series are extracted from the time-series oscillating frequency data as feature values for the regular sections. The fourth gap-determination processor 72D compares the difference between the maximum value of the maximum-value data series and the maximum value of the minimum-value data series with a threshold, determines, from the comparison result, whether or not the liquid level has been detected properly, and outputs the determination result to the second controller 8. The fourth gap-determination processor 72D checks the stability (such as presence or absence of noise) of the waveform (electrostatic capacity waveform) formed by the time-series oscillating frequency data.

The second controller 8 determines whether a gap is present between the tip portion 1e of the dispensing probe 1a and the liquid level in the container 2 and a reason for the gap by using a combination of determination results of the first gap-determination processor 72A to the fourth gap-determination processor 72D. The determination result of the second controller 8 is output to the display unit 9, and is displayed on a screen of the display unit 9.

The Hardware Configuration of a Computer

Figure 2:
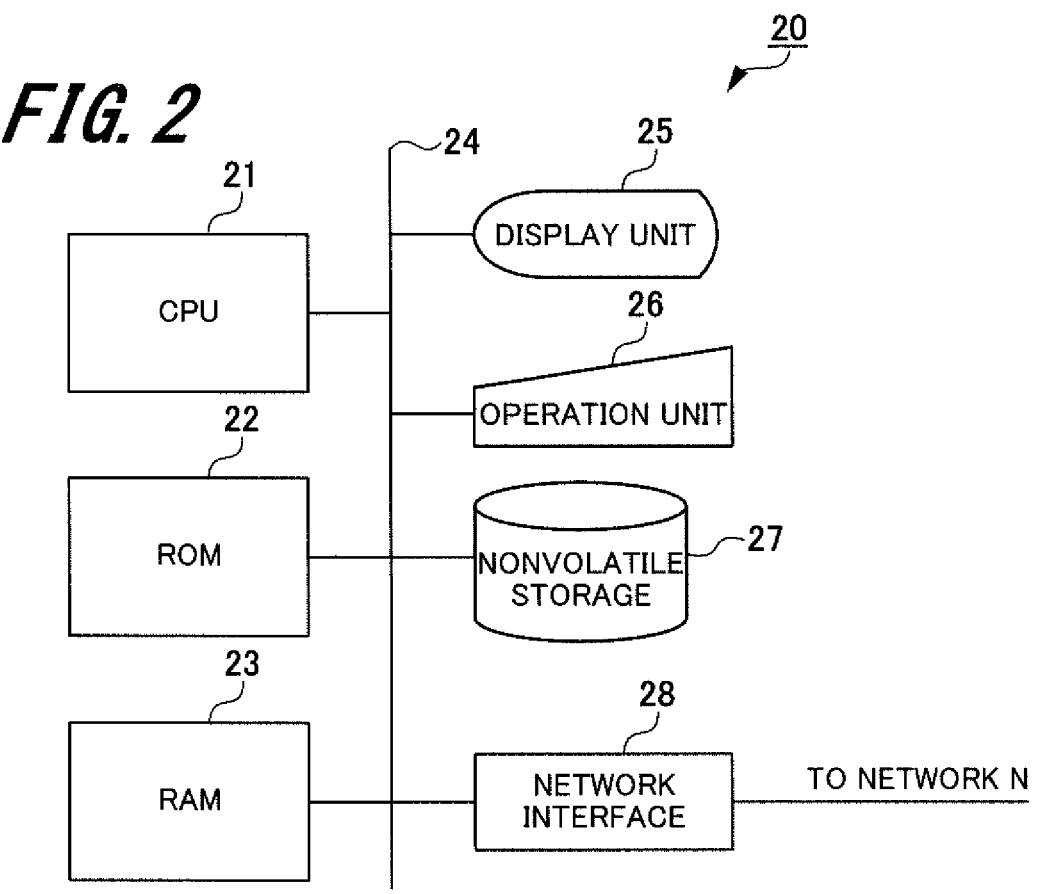
FIG. 2 is a block diagram illustrating an exemplary hardware configuration of a computer.

FIG. 2 is a block diagram illustrating an exemplary hardware configuration of a computer included in the automatic analyzer 10.

A computer 20 includes a central processing unit (CPU) 21, a read only memory (ROM) 22, and a random access memory (RAM) 23 which are connected to each other through a bus 24. The computer 20 also includes a display unit 25, an operation unit 26, a nonvolatile storage 27, and a network interface 28.

The CPU 21 reads, from the ROM 22 for execution, software program codes for implementing the functions according to the first embodiment. For example, the CPU 21 enables the functions of the first processor 5, the second processor 7, and the second controller 8 to be implemented. Instead of the CPU 21, the computer 20 may include a processing device such as a micro-processing unit (MPU).

In the RAM 23, variables, parameters, and the like that are generated midway during a calculation process are written temporarily. For example, the RAM 23, serving as the storage unit 6 in FIG. 1, may be used to store digital alternating current signal data that is output from the CR oscillation circuit 4.

The display unit 25, corresponding to the display unit 9 in FIG. 1, displays a result and the like of a process performed by the computer 20. For example, the display unit 25 is a liquid-crystal display monitor. In the operation unit 26, for example, a keyboard and a mouse, a touch panel, or the like is used, and a user may provide given operation input and instructions.

As the nonvolatile storage 27, for example, a hard disk drive (HDD), a solid state drive (SSD), a flexible disk, an optical disk, a magneto-optical disk, a compact disc-read-only memory (CD-ROM), a CD recordable (CD-R), a magnetic tape, and a noncontact memory card are used. In the nonvolatile storage 27, an operating system (OS) and various parameters as well as programs for causing the computer 20 to function are recorded. For example, the nonvolatile storage 27 stores programs (see FIG. 5) for determination of whether a gap from a liquid level (gap determination) is present and determination of a reason for the gap (gap reason determination), a gap-from-liquid-level-and-gap-reason determination table 41 which is hereinafter referred as a "gap-reason determination table 41" (see FIG. 6), and a recommended-coping-procedure table 42 (see FIG. 7).

As the network interface 28, for example, a network interface card (NIC) is used. The network interface 28 is capable of receiving/transmitting various data between apparatuses through a network N such as a local area network (LAN).

Operations in Detection of Liquid

Figure 3:
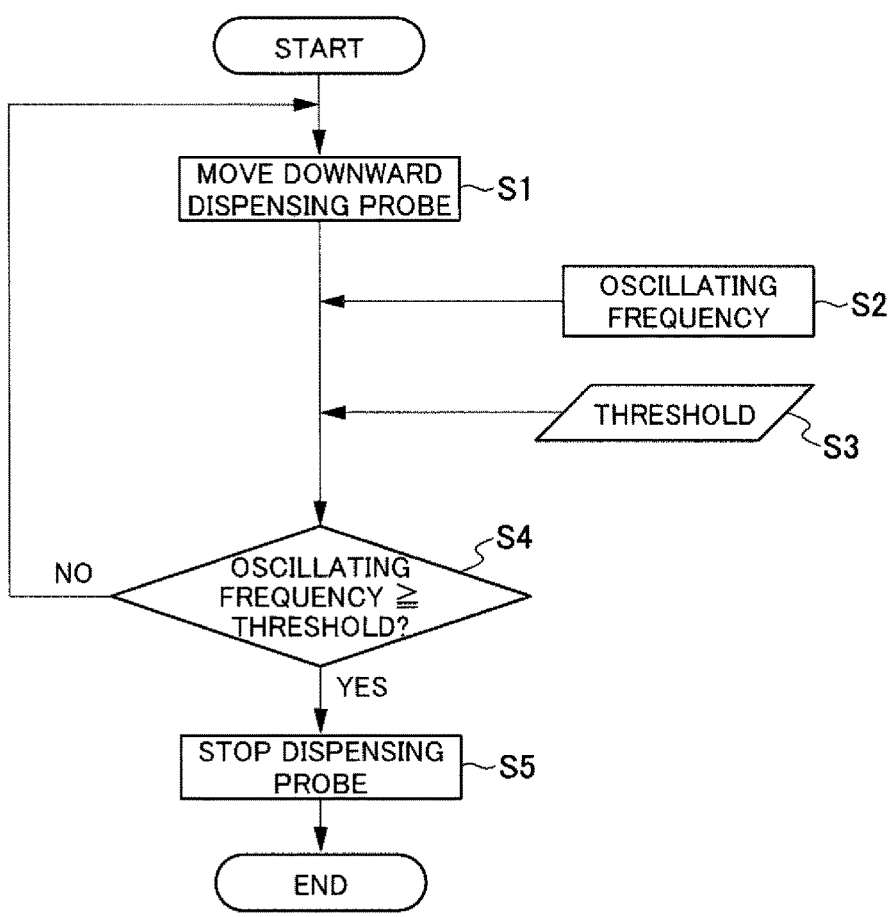
FIG. 3 is a flowchart of operation performed when a first processor of the automatic analyzer in FIG. 1 detects a liquid level.

FIG. 3 is a flowchart of an operation performed when the first processor 5 of the automatic analyzer 10 detects a liquid level. The operation is implemented by the first processor 5, the dispensing unit 1, and the CR oscillation circuit 4 in FIG. 1.

As a precondition, the detection unit 51 of the first processor 5 successively monitors the oscillating frequency of an alternating current signal that is output by the CR oscillation circuit 4. First, when the test target container 2 is conveyed, the first controller 52 of the first processor 5 starts an operation of moving downward the dispensing probe 1a at a set timing (S1).

At that time, the detection unit 51 continues monitoring the oscillating frequency (S2). In parallel with the monitoring, the detection unit 51 reads a threshold for oscillating frequency which is set in advance in the storage unit 6, from the storage unit 6 (S3). The detection unit 51 determines whether or not an oscillating frequency obtained through the monitoring is equal to or larger than the threshold (S4).

When the tip portion 1e of the dispensing probe 1a comes into contact with the liquid level in the container 2, the value of the electrostatic capacity between the dispensing probe 1a and the surrounding portion is remarkably increased. Therefore, the oscillating frequency exceeds the threshold. If the oscillating frequency is equal to or larger than the threshold (YES in S4), the detection unit 51 outputs a signal (liquid-level detection ON signal) indicating that the liquid level in the container 2 has been detected, to the first controller 52. After receiving the liquid-level detection ON signal, the first controller 52 transmits a control signal to stop the moving-downward operation of the dispensing probe 1a, to the driving mechanism 1c of the dispensing unit 1 immediately (S5). Thus, the driving mechanism 1c stops the moving-downward operation of the dispensing probe 1a, and the tip portion 1e of the dispensing probe 1a is in contact with the liquid level in the container 2.

In contrast, if the oscillating frequency is less than the threshold (NO in S4), the first controller 52 causes the process to proceed to step S1, and continues the moving-downward operation of the dispensing probe 1a.

The operation of detecting a liquid level, which is performed through the above-described first processor 5, is implemented by using the related art, and is a precondition of the embodiment of the present invention. The operation of detecting a liquid level may be implemented through hardware or software.

An Exemplary Normal Electrostatic Capacity Waveform

Figure 4:
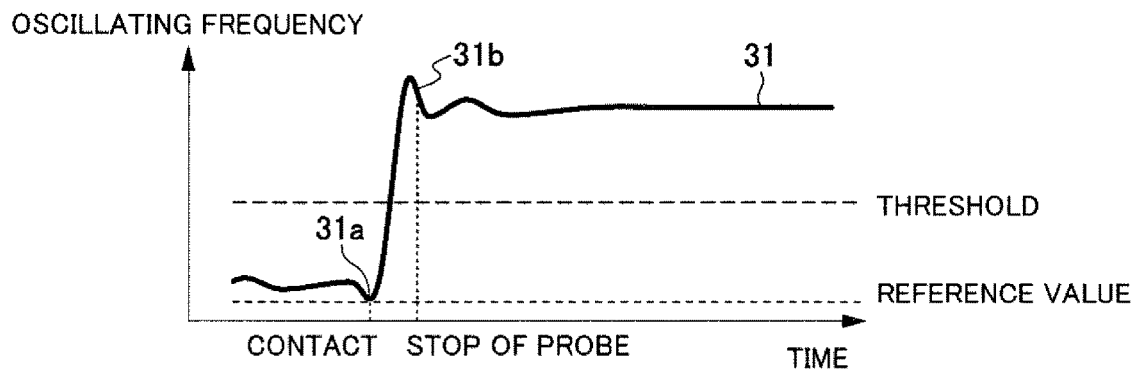
FIG. 4 is a graph illustrating an exemplary electrostatic capacity waveform obtained when a liquid level has been detected properly.

FIG. 4 is a graph illustrating an exemplary electrostatic capacity waveform obtained when a liquid level has been detected properly. In FIG. 4, the horizontal axis represents time, and the vertical axis represents oscillating frequency (correlated with the electrostatic capacity value). It is assumed that a sample to be tested is in the normal state.

Even after a period from the start of an operation of detecting a liquid level to the end of the operation (the dispensing probe 1a is stopped), the CR oscillation circuit 4 outputs an alternating current signal. The storage unit 6 stores, as time-series data, alternating current signal data obtained in a period from the start of a moving-downward operation of the dispensing probe 1a till a time point at which a certain period of time has been elapsed. The period includes a period for a state in which the dispensing probe 1a touches the liquid level and stops. As illustrated in FIG. 4, change in the electrostatic capacity which is produced in this case appears as change in the oscillating frequency of the alternating current signal (electrostatic capacity waveform).

When the tip portion 1e of the dispensing probe 1a is located at a certain distance from the surrounding portion, the oscillating frequency of a waveform 31 has a value near a given reference value or larger than the reference value. While the dispensing probe 1a moves downward, the electrostatic capacity hardly or slightly changes, and the electrostatic capacity value will not exceed a threshold indicated by using a broken line. However, when the tip portion 1e of the dispensing probe 1a comes into contact with the liquid level (at a timing 31a), the electrostatic capacity value exceeds the threshold, and the dispensing probe 1a stops (at a timing 31b). Just after stopping of the dispensing probe 1a, the oscillating frequency fluctuates. This may be because the liquid level is being swung. After that, the state (contact with the liquid level) of the tip portion 1e of the dispensing probe 1a and the surrounding portion does not change. Thus, the electrostatic capacity value converges to a substantially constant value.

Gap Determination and Gap Reason Determination

Figure 5:
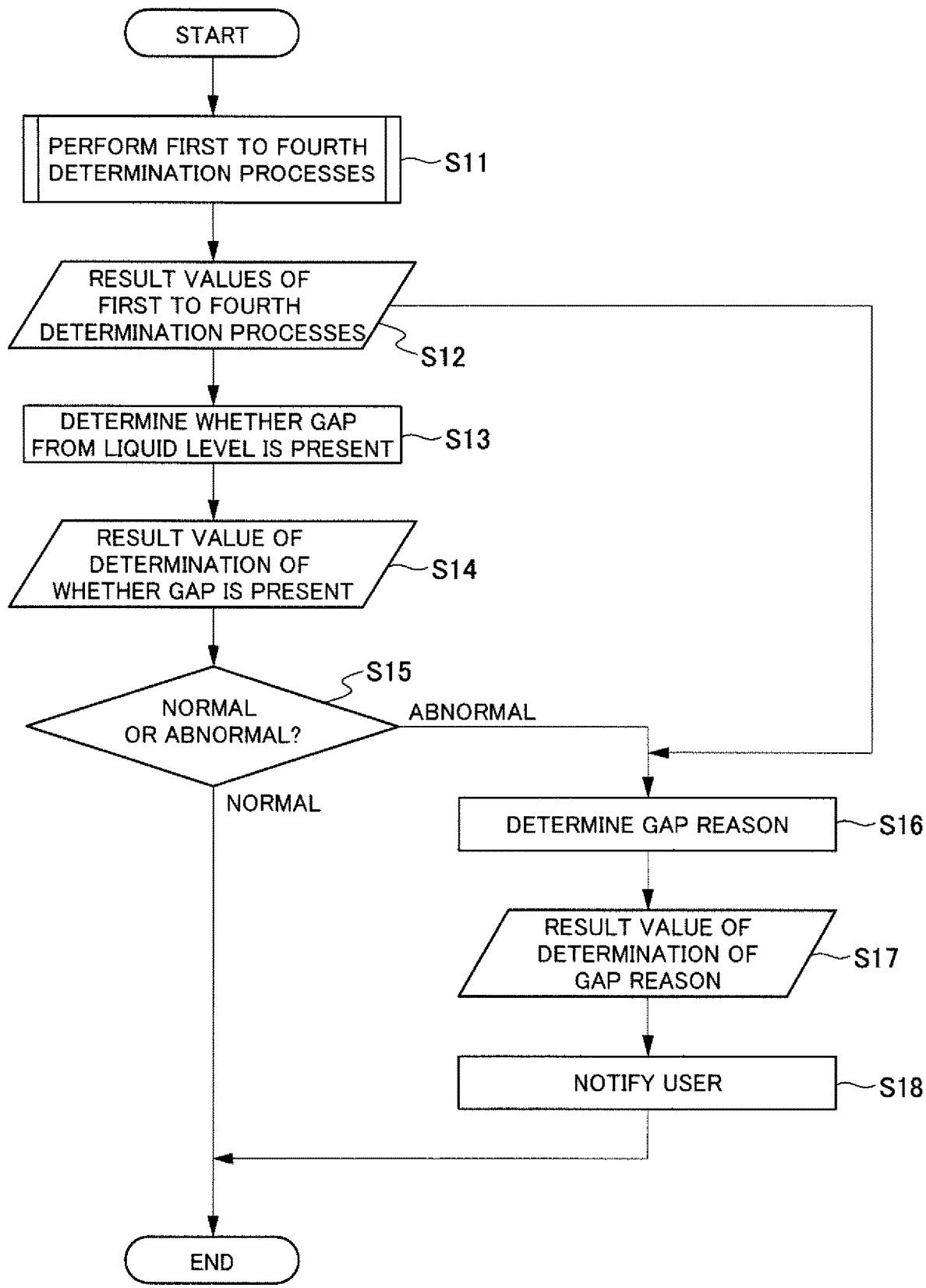
FIG. 5 is a flowchart for determination of whether a gap from a liquid level is present and determination of a reason for the gap according to the embodiment of the present invention.

FIG. 5 is a flowchart of gap determination and gap reason determination that are performed by the second processor 7 of the automatic analyzer 10. This process is implemented by using the second processor 7 and the second controller 8 in FIG. 1.

The second processor 7 first performs calculation processes for first determination to fourth determination by using the first gap-determination processor 72A to the fourth gap-determination processor 72D (S11). The calculation unit 71 divides time-series data that is output from the CR oscillation circuit 4 and that is stored in the storage unit 6 (in FIG. 1), into data groups in short regular sections. The calculation unit 71 calculates the maximum value and the minimum value for each regular section, and generates two types of time-series data, a maximum-value data series and a minimum-value data series. The two types of time-series data are processed in parallel by the first gap-determination processor 72A to the fourth gap-determination processor 72D. Each of the first gap-determination processor 72A to the fourth gap-determination processor 72D outputs a determination result value represented as a binary of normality (Pass) and abnormality (Fail), to the second controller 8 (S12).

The second controller 8 uses the determination result values from the first gap-determination processor 72A to the fourth gap-determination processor 72D so as to make gap determination on the basis of a combination of the determination result values (S13), and outputs the determination result value for a gap from the liquid level (S14). The gap determination is made by using the gap-reason determination table 41 in FIG. 6 which will be described below.

Subsequently, the second controller 8 determines whether the result value of the gap determination in step S14 indicates normality or abnormality (S15). If the result indicates normality (NORMAL in S15), the process of gap determination and gap reason determination in FIG. 5 is ended.

In contrast, if the result value of the gap determination indicates abnormality (ABNORMAL in S15), the second controller 8 uses the determination result values from the first gap-determination processor 72A to the fourth gap-determination processor 72D so as to determine a gap reason (S16). The second controller 8 outputs a determination result value of a gap reason (S17). The gap reason determination is made by using the gap-reason determination table 41 in FIG. 6 which will be described below.

The second controller 8 notifies a user of the following information by displaying the information on the display unit 25 (S18): the determination result indicating whether or not the tip portion 1e of the dispensing probe 1a is in contact with the liquid level; and the gap reason status. At that time, if the gap determination result is "Fail", a user is notified of a recommended coping procedure for the reason. When the process in S18 is ended, the process of gap determination and gap reason determination in FIG. 5 ends.

The Gap-Reason Determination Table

FIG. 6 illustrates an exemplary gap-reason determination table indicating combinations of determination results from the first to fourth determination processes and a gap reason.

The gap-reason determination table 41 in FIG. 6 has fields of "FIRST DETERMINATION PROCESSING RESULT", "SECOND DETERMINATION PROCESSING RESULT", "THIRD DETERMINATION PROCESSING RESULT", "FOURTH DETERMINATION PROCESSING RESULT", "GAP DETERMINATION RESULT", and "GAP REASON". Each combination of first to fourth determination processing results is subjected to pattern classification, and a combination pattern is associated with a gap reason. In FIG. 6, 16 patterns of patterns 0 to 15 are registered.

Gap reasons are classified roughly into three types, "CONTACT", "BUBBLE", and "STATIC ELECTRICITY". The combination table in FIG. 6 is stored in advance in the automatic analyzer 10 (for example, the nonvolatile storage 27), and is used in gap determination and gap reason determination. A gap reason is determined in the following manner. From results obtained from experiments using the automatic analyzer 10, ratios at which each combination pattern is caused by the respective reasons are obtained, and the reason having the highest ratio is regarded as the highest probability reason. Therefore, correspondences between a gap reason and a combination pattern may be changed depending on the configuration of the automatic analyzer 10 and thresholds used in the determination logic. These gap reasons are employed because they are presumed to have high probabilities, and may be changed. A gap reason is displayed, for notification to a user, on the display unit 25 as a factor that is to be preferentially checked, while other gap reasons are listed.

For example, pattern 0 indicates a case in which all of the first, second, third, and fourth determination processing results are "Pass". In pattern 0, the result of the gap determination is "NORMAL", and the gap reason is "NOT APPLICABLE". Pattern 1 indicates a case in which the first to third determination processing results are "Pass" and in which the fourth determination processing result is "Fail". In pattern 1, the result of the gap determination is "ABNORMAL", and the gap reason is "STATIC ELECTRICITY". In association with each of the gap reasons, a recommended coping procedure may be notified to a user.

Results of Gap Reason Determination and Recommended Coping Procedures

FIG. 7 is an exemplary recommended-coping-procedure table in which recommended coping procedures are registered for the results of gap reason determination.

In the recommended-coping-procedure table 42 in FIG. 7, as a recommended coping procedure that is set for a gap reason of "CONTACT" and that is to be displayed on a monitor, a model sentence of "Check if the container is set properly. In the case of a little amount of sample, transfer the sample to a container of smaller capacity." is indicated.

As a recommended coping procedure for a gap reason of "BUBBLE", a model sentence of "Remove bubbles on the sample surface." is indicated.

As a recommended coping procedure for a gap reason of "STATIC ELECTRICITY", a model sentence of "Wipe the sample container with a wet cloth." is indicated.

As a recommended coping procedure for a gap reason of "UNKNOWN", a model sentence of "Check if contact, bubbles, or static electricity is produced." is indicated. A case in which it is determined that the reason is unknown is a case such as an impossible combination of four determination results.

Details of Operations of the Second Processor

The first to fourth determination processes which are performed by the second processor 7 and which are subroutines in step S11 in FIG. 5 will be described in detail.

The First Determination Process

The first determination process will be described first. The first determination process is performed by the calculation unit 71 and the first gap-determination processor 72A.

Figure 8:
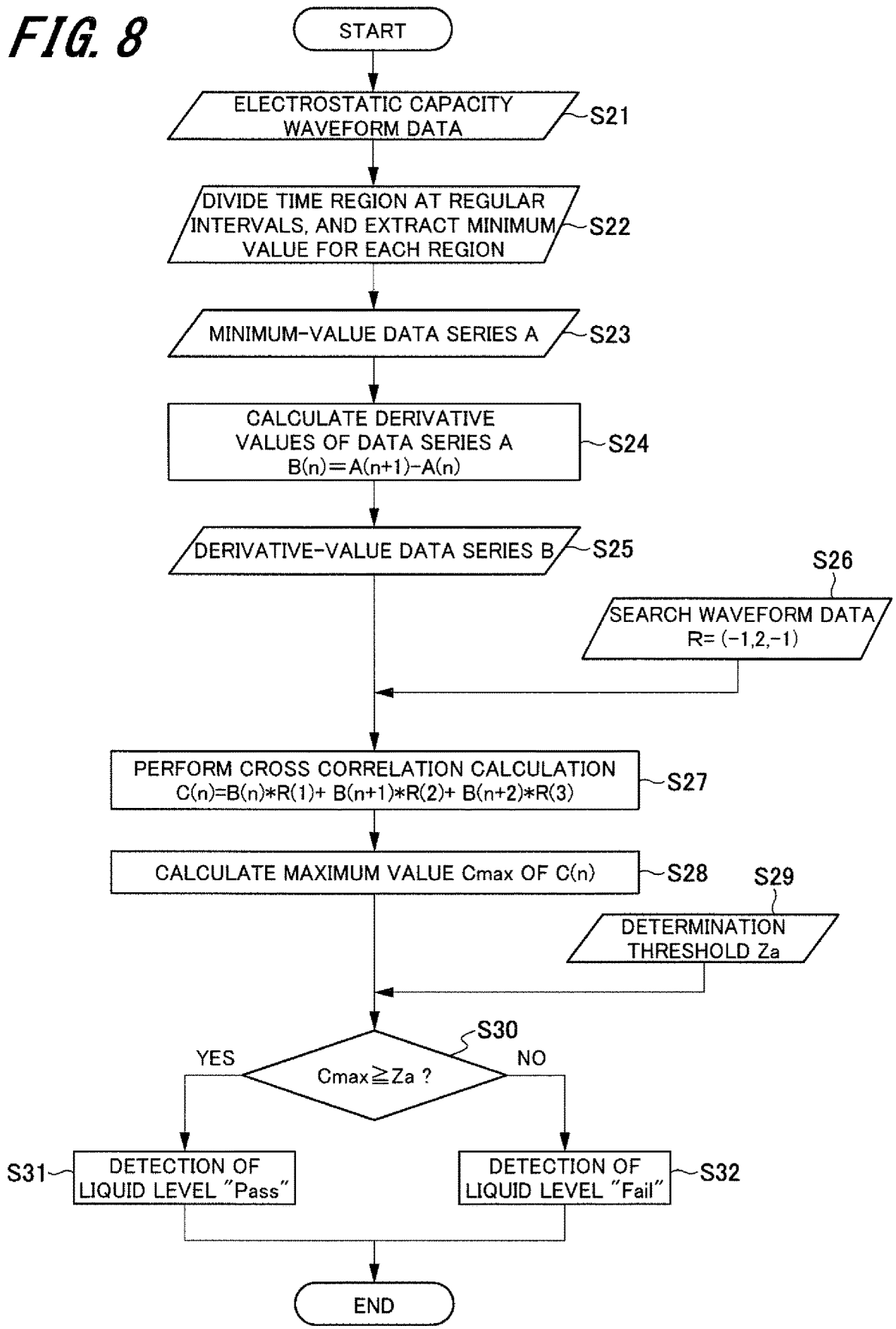
FIG. 8 is a flowchart of the first determination process.

FIG. 8 is a flowchart of the first determination process.

Figure 9:
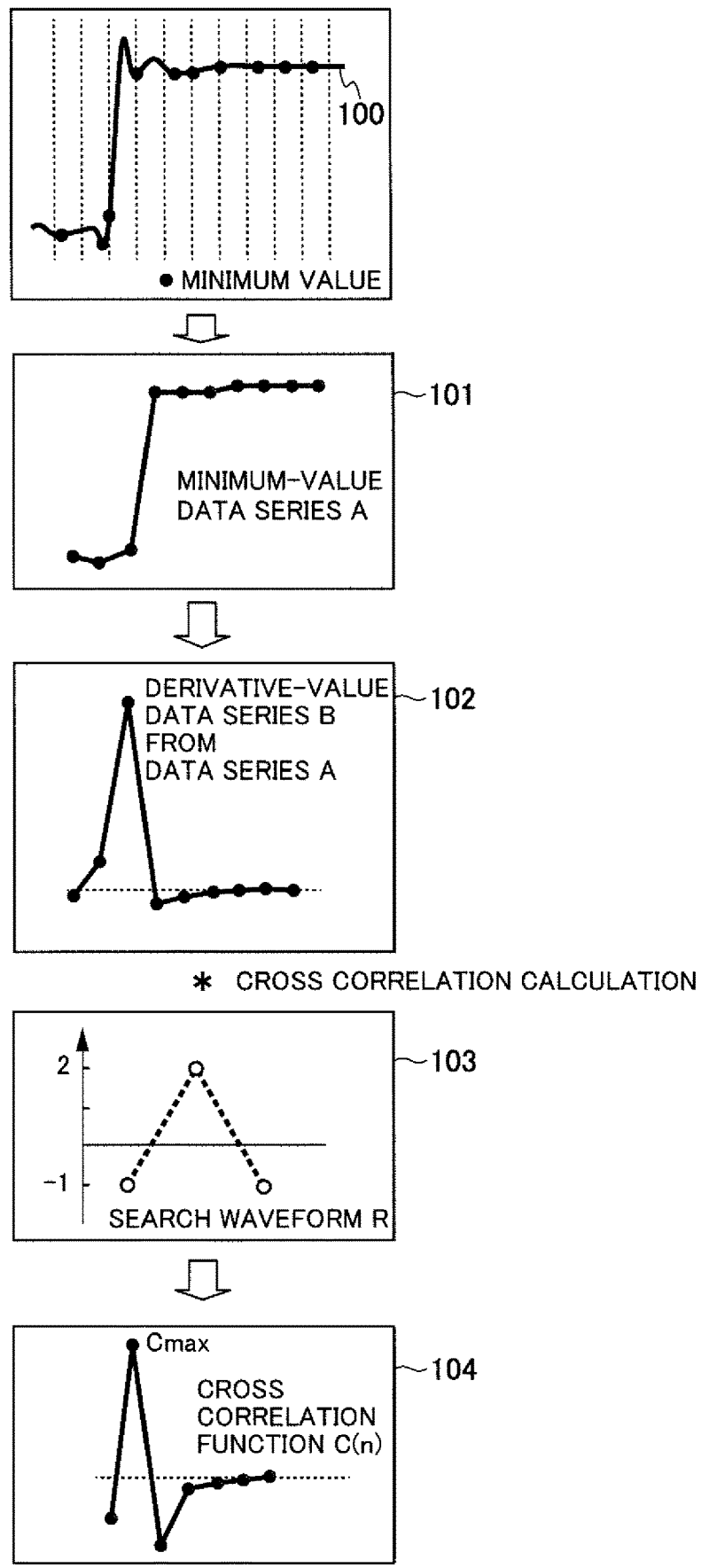
FIG. 9 is a diagram illustrating images in processing on an electrostatic capacity waveform.

FIG. 9 is a diagram illustrating images in processing on an electrostatic capacity waveform. In the graph of a waveform 100 in FIG. 9, similarly to FIG. 4, the horizontal axis represents time, and the vertical axis represents oscillating frequency.

The calculation unit 71 of the second processor 7 obtains time-series oscillating frequency data of an alternating current signal, as electrostatic capacity waveform data (the waveform 100 in FIG. 9) from alternating current signal data stored in the storage unit 6 (S21). Then, the calculation unit 71 sets, to the electrostatic capacity waveform data, time regions (regular sections) at certain intervals from the start of the measurement (the start of the moving-downward operation of the dispensing probe 1a) until the end of the measurement, and extracts the minimum value (indicated by a black circle mark) of the pieces of oscillating frequency data in each time region as a feature value (S22). The calculation unit 71 outputs the multiple pieces of minimum-value data as a data series A (an image 101 in FIG. 9) (S23).

Then, the first gap-determination processor 72A obtains the minimum-value data series A from the calculation unit 71, and performs differential calculation on the data series A (S24). That is, the first gap-determination processor 72A applies a function B(n) in Expression 1 to each element in the data series A, and obtains a data series B (an image 102 in FIG. 9) constituted by derivative values of the data series A (S25). In Expression 1, n represents a natural number.

$$B(n)=A(n+1)-A(n) \qquad \text{Expression 1}$$

The first gap-determination processor 72A refers to search waveform data R (an image 103 in FIG. 9) registered in advance in the nonvolatile storage 27 or the like (S26). The search waveform data R is also an exemplary processing filter. In the first embodiment, the search waveform data R is a waveform constituted by three elements, (−1, 2, −1). The search waveform data R is designed in order to calculate the goodness of fit with a waveform in which the value rises temporarily, that is, a spiky waveform. A reason why the search waveform data R has a negative value is that, after a cross correlation process is performed on the data series B, the average of elements in a data series to which the search waveform data R has been applied is same as the average obtained before the cross correlation process. As long as the search waveform data R is a spiky waveform, that is, the search waveform data R has a shape in which the difference between a certain element and its adjacent elements is relatively large enough, the search waveform data R may have three or more elements. Instead, the search waveform data R may have other values.

A cross correlation function C(n) between the data series B and the search waveform data R is represented, for example, by using Expression 2. In Expression 2, R(1) represents a set value of the left element of the three elements in the search waveform data R; R(2) represents a set value of the central element of the three elements; and R(3) represents a set value of the right element of the three elements.

$$C(n)=B(n) \times R(1)+B(n+1) \times R(2)+B(n+2) \times R(3) \qquad \text{Expression 2}$$

At that time, the values in a range from 1 to the number of points in the data series B minus 2 are sequentially set to n, and the cross correlation calculation is performed on each value of n (S27). The result of the cross correlation calculation is the cross correlation function $C(n)$ (an image 104 in FIG. 9). Subsequently, the maximum value Cmax of the cross correlation function $C(n)$ is obtained (S28). In this operation, a point is a point at which a feature value is extracted.

The first gap-determination processor 72A refers to a determination threshold Za stored in advance in the ROM 22 or the like (S29), and compares the maximum value Cmax of the cross correlation function with the determination threshold Za so as to determine which is larger (S30).

In step S30, if the maximum value Cmax of the cross correlation function is equal to or larger than the determination threshold Za (YES in S30), the first gap-determination processor 72A determines that the liquid level has been detected properly, i.e., Pass, (S31). Then, the process of the flowchart is ended, and the process proceeds to step S12 in FIG. 5.

In contrast, in step S30, if the maximum value Cmax of the cross correlation function is less than the determination threshold Za (NO in S30), the first gap-determination processor 72A determines that the liquid level has not been detected properly, i.e., Fail, (S32). The process of the flowchart is ended, and the process proceeds to step S12 in FIG. 5.

If it is determined that the liquid level has not been detected properly, the first gap-determination processor 72A may notify a user of the determination result through the display unit 9.

Thus, in the first determination process, electrostatic capacity values are obtained through sampling at appropriate time intervals in a period from a time point before the detection of a liquid level until a time point after the detection. Subsequently, from the data (time-series data) obtained through sampling, a feature value is extracted for each group of a certain number of data, and a new data series is generated from the feature values and stored. A cross correlation between the new data series and a normal waveform model (for example, a spiky waveform) is obtained. From the result, it is determined whether or not the liquid level has been detected properly. The first determination process provides information about whether or not the shape of change in an electrostatic capacity waveform is close to a normal waveform.

The case in which the minimum value is extracted as a feature value for time-series data is described. Alternatively, the maximum value may be extracted. In addition, the data series is generated through differential calculation of feature values of time-series data.

The Second Determination Process

Next, the second determination process will be described. The second determination process is performed by the calculation unit 71 and the second gap-determination processor 72B.

Figure 10:
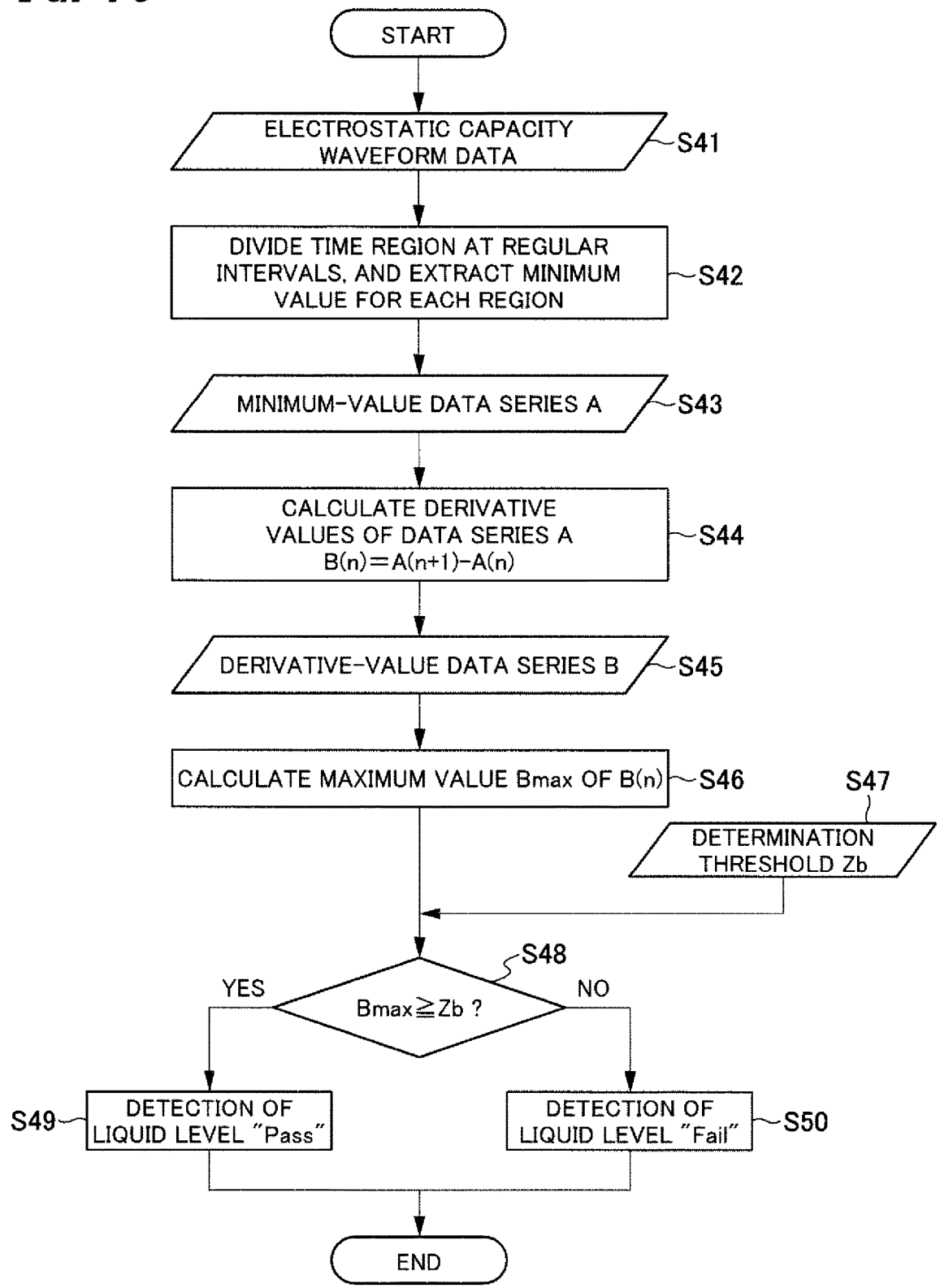
FIG. 10 is a flowchart of the second determination process.

FIG. 10 is a flowchart of the second determination process.

FIG. 11 is a diagram illustrating images in processing on an electrostatic capacity waveform.

The calculation unit 71 of the second processor 7 performs processes in steps S41 to S43, and generates the minimum-value data series A. Since the processes in steps S41 to S43 are same as the processes in steps S21 to S23 in FIG. 8, detailed description will be avoided.

Subsequently, the second gap-determination processor 72B performs processes in steps S44 to S45, and generates the derivative-value data series B. Since the processes in steps S44 to S45 are similar to the processes in steps S24 to S25 in FIG. 8, detailed description will be avoided.

The second gap-determination processor 72B obtains the maximum value Bmax of the derivative value function $B(n)$ (the image 102 in FIG. 11) (S46). The maximum value Bmax corresponds to the magnitude of the largest inclination of the waveform formed by the derivative-value data series B. The second gap-determination processor 72B refers to a determination threshold Zb stored in advance in the ROM 22 or the like (S47), and compares the maximum value Bmax of the derivative values with the determination threshold Zb so as to determine which is larger (S48).

In step S48, if the maximum value Bmax of the derivative values is equal to or larger than the determination threshold Zb (YES in S48), the second gap-determination processor 72B determines that the liquid level has been detected properly, i.e., Pass, (S49). The process of the flowchart is ended, and the process proceeds to step S12 in FIG. 5.

In contrast, in step S48, if the maximum value Bmax of the derivative values is less than the determination threshold Zb (NO in S48), the second gap-determination processor 72B determines that the liquid level has not been detected properly, i.e., Fail, (S50). The process of the flowchart is ended, and the process proceeds to step S12 in FIG. 5.

If the second gap-determination processor 72B determines that the liquid level has not been detected properly, the second gap-determination processor 72B may notify a user of the determination result through the display unit 9.

Thus, in the second determination process, electrostatic capacity values are obtained through sampling at appropriate time intervals in a period from a time point before detection of a liquid level till a time point after the detection. Subsequently, from the data (time-series data) obtained through sampling, a feature value is extracted for each group of a certain number of data, and a new data series is generated from the feature values and stored. Then, the maximum value of the new data series is obtained. From the result, it is determined whether or not the liquid level has been detected properly. The second determination process provides information about whether or not the magnitude (steepness) of change in an electrostatic capacity waveform is normal. The second determination process may be effective mainly in determination of whether or not the erroneous detection has occurred due to contact. However, the final gap reason is determined on the basis of a combination of the four determination results.

The case in which the minimum value is extracted as a feature value of time-series data is described. Alternatively, the maximum value may be extracted. In addition, the data series is generated through differential calculation of feature values of time-series data.

The Third Determination Process

Next, the third determination process will be described. The third determination process is performed by the calculation unit 71 and the third gap-determination processor 72C.

Figure 12:
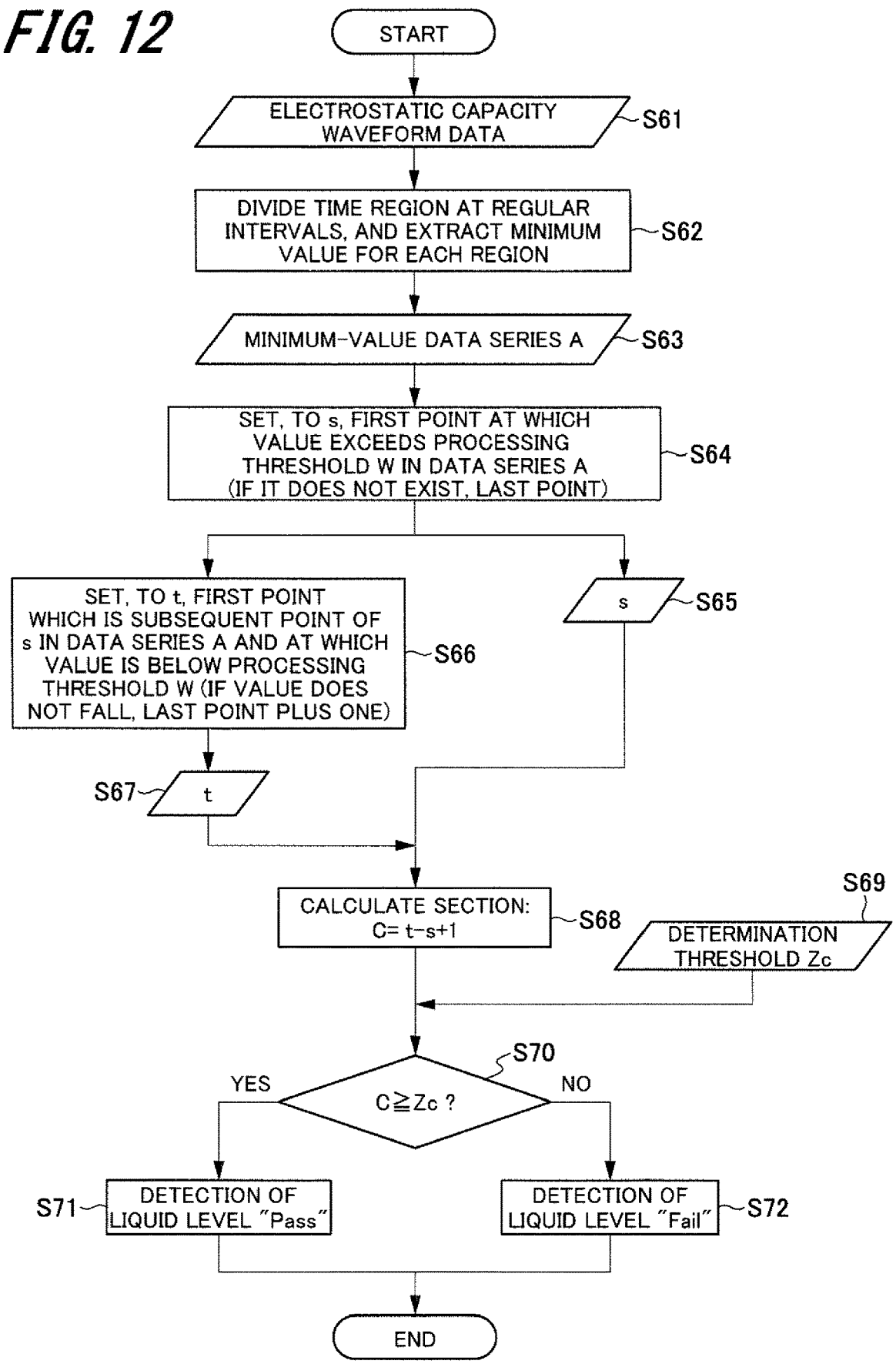
FIG. 12 is a flowchart of the third determination process.

FIG. 12 is a flowchart of the third determination process.

Figure 13:
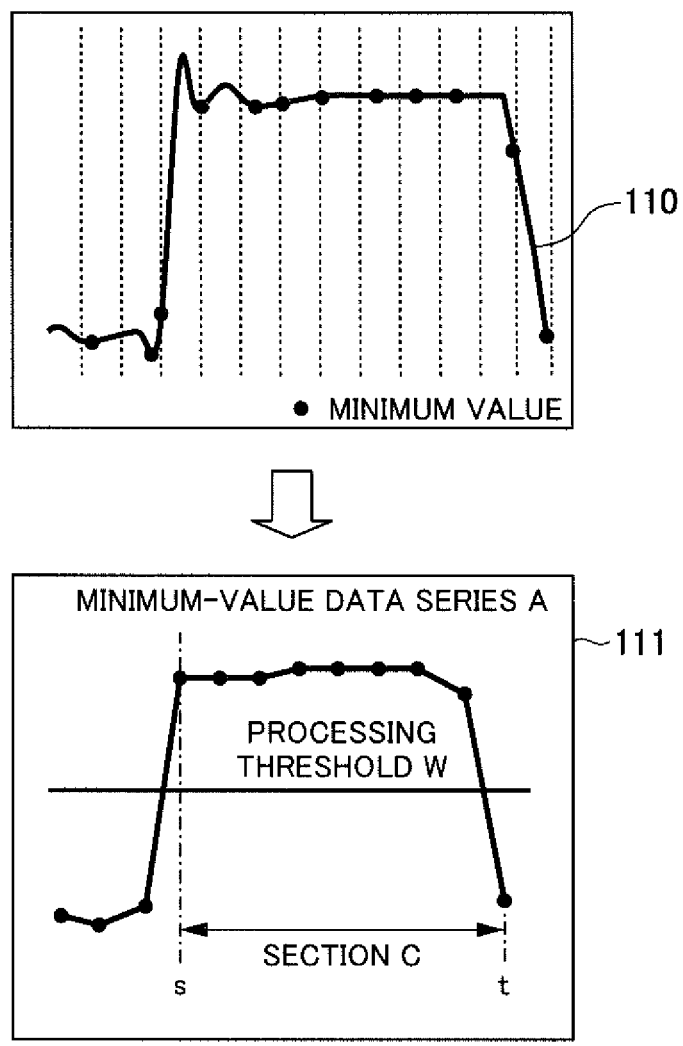
FIG. 13 is a diagram illustrating images in processing on an electrostatic capacity waveform.

FIG. 13 is a diagram illustrating images in processing on an electrostatic capacity waveform.

The calculation unit 71 of the second processor 7 performs processes in steps S61 to S63 on electrostatic capacity waveform data (a waveform 110 in FIG. 13), and generates the minimum-value data series A. When the dispensing probe 1a moves upward and the tip portion 1e is detached from the liquid level, the oscillating frequency value of the waveform 110 is decreased. Since the processes in steps S61 to S63 are the same as the processes in steps S21 to S23 in FIG. 8, detailed description will be avoided.

Subsequently, the third gap-determination processor 72C refers to a threshold W for data processing which is stored in advance in the storage unit 6, and searches for the s-th point at which the value first exceeds the threshold W, starting from the first point in the data series A (S64 and S65). In other words, a point at which the value first exceeds the threshold W in the data series A is set to s. A point is a point at which a feature value is extracted. If a point corresponding to s is not found in the first search, that is, if none of the points in the data series A exceeds the threshold W, the last point (final point) in the data series A is set to s.

Subsequently, the third gap-determination processor 72C searches for the first point which is one of the s-th point and its subsequent points in the data series A and at which the value is equal to or less than the threshold W, and sets the found point as t (S66 and S67). If a point at which the value is equal to or less than the threshold W is not present, that is, if the value of the data series A never goes down to a value equal to or less than the threshold W after the value exceeds the threshold W, the end point plus one is set to t.

The third gap-determination processor 72C calculates the length of a section C during which the value of the data series A exceeds the threshold W, by using Expression 3 (S68). The length of the section C is indicated by using the number of points in the data series A at which the value exceeds the threshold W (an image 111 in FIG. 13).

$$C = t - s + 1 \quad \text{Expression 3}$$

The third gap-determination processor 72C refers to a determination threshold Zc stored in advance in the ROM 22 or the like (S69), and compares the length of the section C with the determination threshold Zc so as to determine which is larger (S70). The determination threshold Zc is set on the basis of a period from a time point at which the tip portion 1e of the dispensing probe 1a comes into contact with the liquid level till a time point at which the dispensing probe 1a moves upward.

In step S70, if the length of the section C is equal to or larger than the determination threshold Zc (YES in S70), the third gap-determination processor 72C determines that the liquid level has been detected properly, i.e., Pass, (S71). The process of the flowchart is ended, and the process proceeds to step S12 in FIG. 5.

In contrast, in step S70, if the length of the section C is less than the determination threshold Zc, (NO in S70), the third gap-determination processor 72C determines that the liquid level has not been detected properly, i.e., Fail, (S72). The process of the flowchart is ended, and the process proceeds to step S12 in FIG. 5.

If the third gap-determination processor 72C determines that the liquid level has not been detected properly, the third gap-determination processor 72C may notify a user of the determination result through the display unit 9.

Thus, in the third determination process, electrostatic capacity values are obtained through sampling at appropriate time intervals in a period from a time point before detection of a liquid level till a time point after the detection. Subsequently, for the data (time-series data) obtained through sampling, the first point at which the value exceeds (reaches) the specific threshold W stored in advance, and a subsequent point at which the value goes down to a value equal to or less than the threshold W are extracted. Then, the number of points between the two extracted points is obtained as the length of the section C during which the value exceeds the threshold W. From the result, it is determined whether or not a liquid level has been detected properly. The third determination process provides information about whether or not the shape of an electrostatic capacity waveform is normal (whether or not a minimum-value sequence which exceeds the threshold W having a certain number of points appear). The third determination process may be effective mainly in determination of whether the erroneous detection has occurred due to bubbles. However, the final gap reason is determined on the basis of a combination of the four determination results.

The case in which the minimum value is extracted as a feature value of time-series data is described. Alternatively, the maximum value may be extracted.

The Fourth Determination Process

Next, the fourth determination process will be described. The fourth determination process is performed by using the calculation unit 71 and the fourth gap-determination processor 72D.

Figure 14:
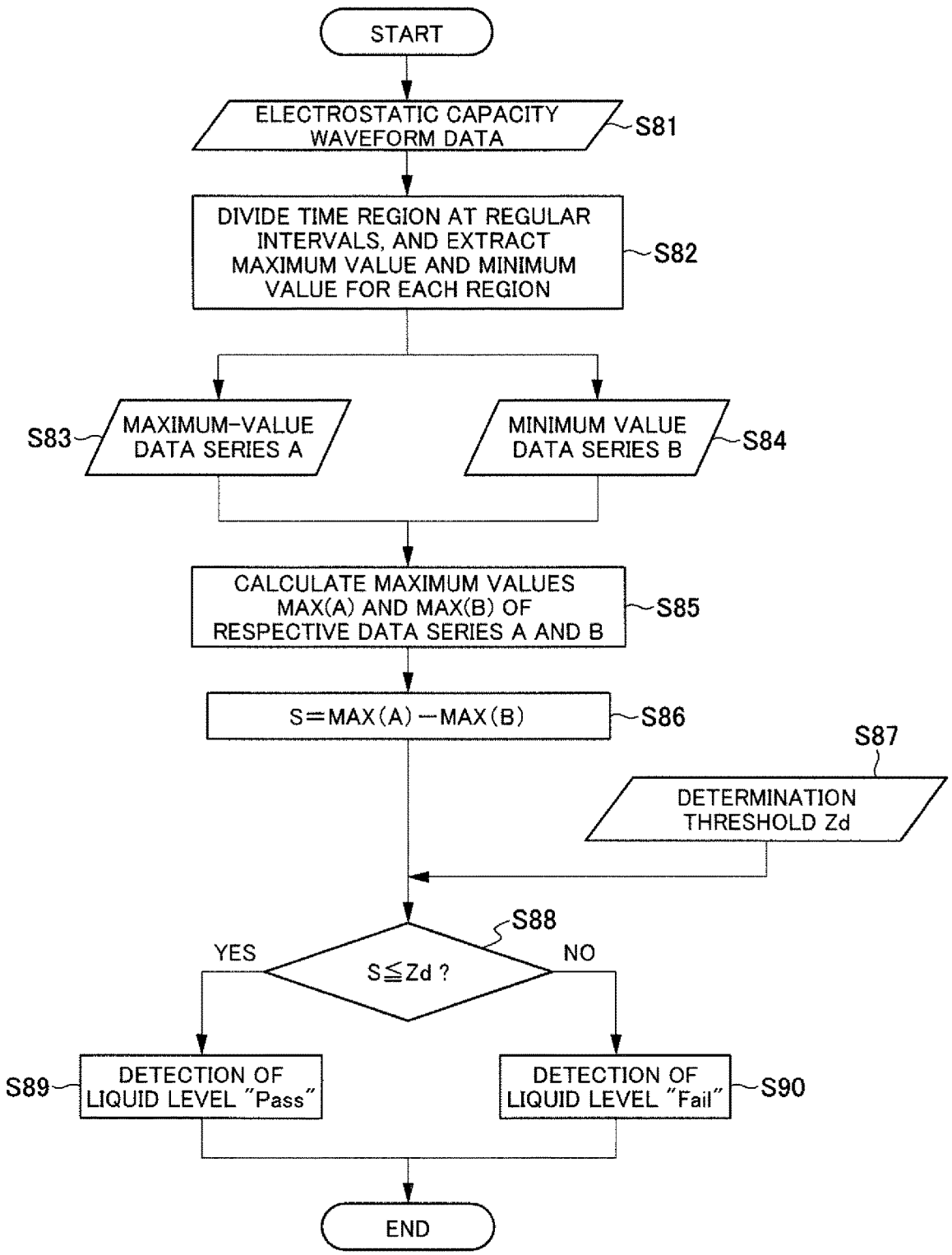
FIG. 14 is a flowchart of the fourth determination process.

FIG. 14 is a flowchart of the fourth determination process.

FIG. 15 is a diagram illustrating images in processing on an electrostatic capacity waveform.

The calculation unit 71 of the second processor 7 obtains time-series oscillating frequency data of an alternating current signal, as electrostatic capacity waveform data (the waveform 100 in FIG. 15) from alternating current signal data stored in the storage unit 6 (S81). The calculation unit 71 sets time regions (regular sections) at certain intervals on the electrostatic capacity waveform data in a period from the start of the measurement (the start of the moving-downward operation of the dispensing probe 1a) until the end of the measurement, and extracts the maximum value (indicated by a hollow circle) and the minimum value (indicated by a black circle) of the pieces of oscillating frequency data in each time region, as feature values (S82). Then, the calculation unit 71 outputs the maximum value data and the minimum value data as a data series A and a data series B as illustrated in an image 121 in FIG. 15 (S83 and S84).

The fourth gap-determination processor 72D calculates the maximum value MAX(A) of the maximum-value data series A and the maximum value MAX(B) of the minimum-value data series B (S85). The fourth gap-determination processor 72D obtains a value S (difference) by subtracting the maximum value MAX(B) from the maximum value MAX(A) as illustrated in an image 122 (S86).

In principle, the maximum value MAX(A) of the maximum-value data series A is always equal to or larger than the maximum value MAX(B) of the minimum-value data series B. Therefore, the difference S is a value equal to or larger than zero.

The fourth gap-determination processor 72D refers to a determination threshold Zd stored in advance in the ROM 22 or the like (S87), and compares the difference S with the determination threshold Zd so as to determine which is larger (S88).

In step S88, if the difference S is equal to or less than the determination threshold Zd, (YES in S88), the fourth gap-determination processor 72D determines that the liquid level has been detected properly, i.e., Pass, (S89). The process of the flowchart is ended, and the process proceeds to step S12 in FIG. 5.

In contrast, in step S88, if the difference S is larger than the determination threshold Zd (NO in S88), the fourth gap-determination processor 72D determines that the liquid level has not been detected properly, i.e., Fail, (S90). The process of the flowchart is ended, and the process proceeds to step S12 in FIG. 5.

If the liquid level has not been detected properly, the fourth gap-determination processor 72D may notify a user of the determination result through the display unit 9.

Thus, in the fourth determination process, electrostatic capacity values are obtained through sampling at appropriate time intervals in a period from a time point before detection of a liquid level till a time point after the detection. Then, from the data (time-series data) obtained through sampling, the maximum value and the minimum value are extracted as feature values for each group of a certain number of data. A data series of maximum values and a data series of minimum values are generated and stored. The maximum value is obtained from each of the two data series. The difference between the two maximum values is calculated. From the result, it is determined whether or not a liquid level has been detected properly. The fourth determination process provides information about whether or not an electrostatic capacity waveform has high stability (presence or absence of noise). The fourth determination process may be effective mainly in determination of whether or not the erroneous detection has occurred due to static electricity. The final gap reason is determined on the basis of a combination of the four determination results.

Data processing on electrostatic capacity waveform data will be described by taking an example. Both of a normal electrostatic capacity waveform (normal waveform) and an abnormal electrostatic capacity waveform (abnormal waveform) will be described.

Exemplary Data Processing on a Normal Waveform

Figure 16:
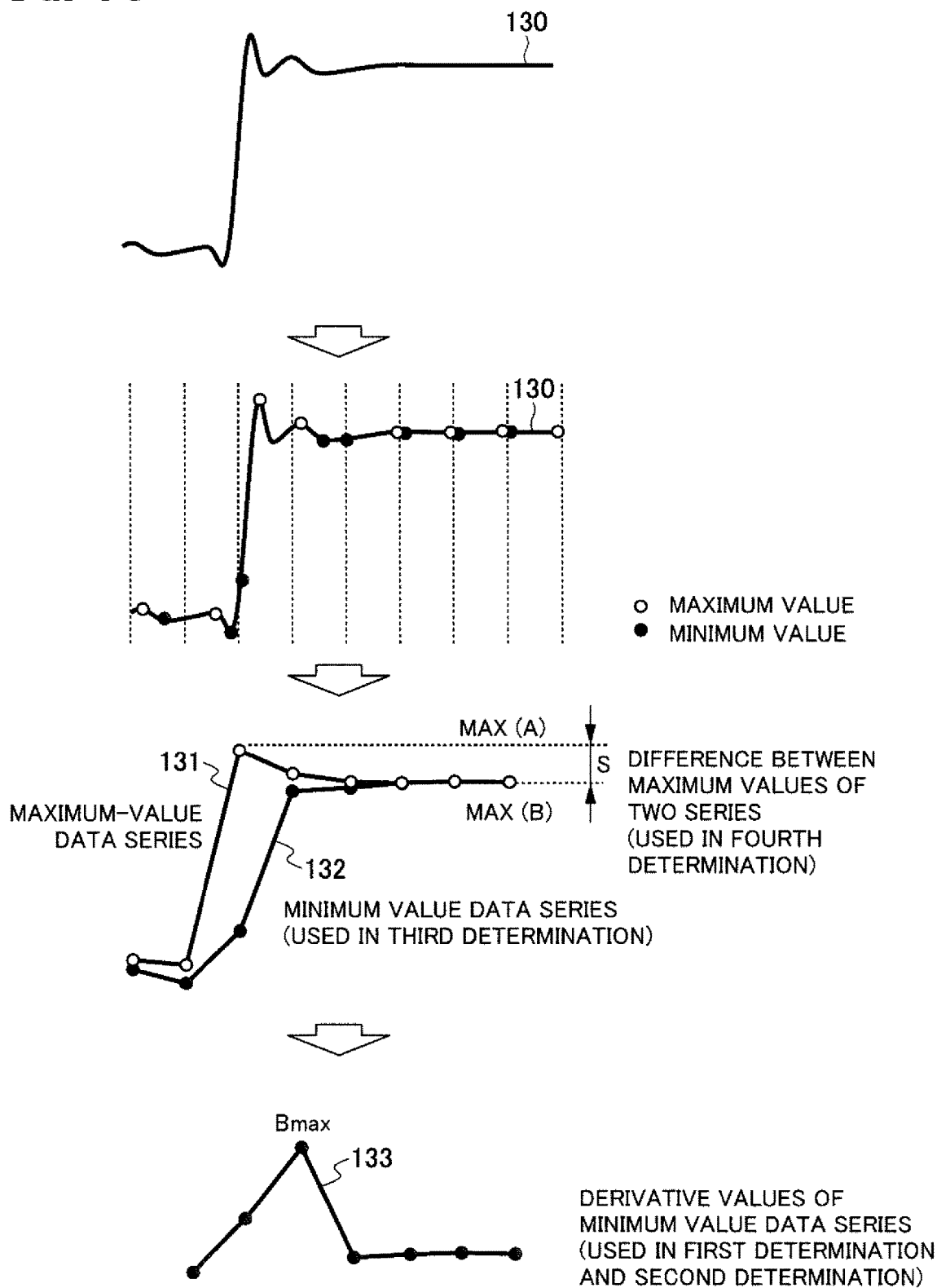
FIG. 16 is a diagram for describing data processing on a normal waveform.

FIG. 16 is a diagram for describing data processing on a normal waveform.

Figure 17:
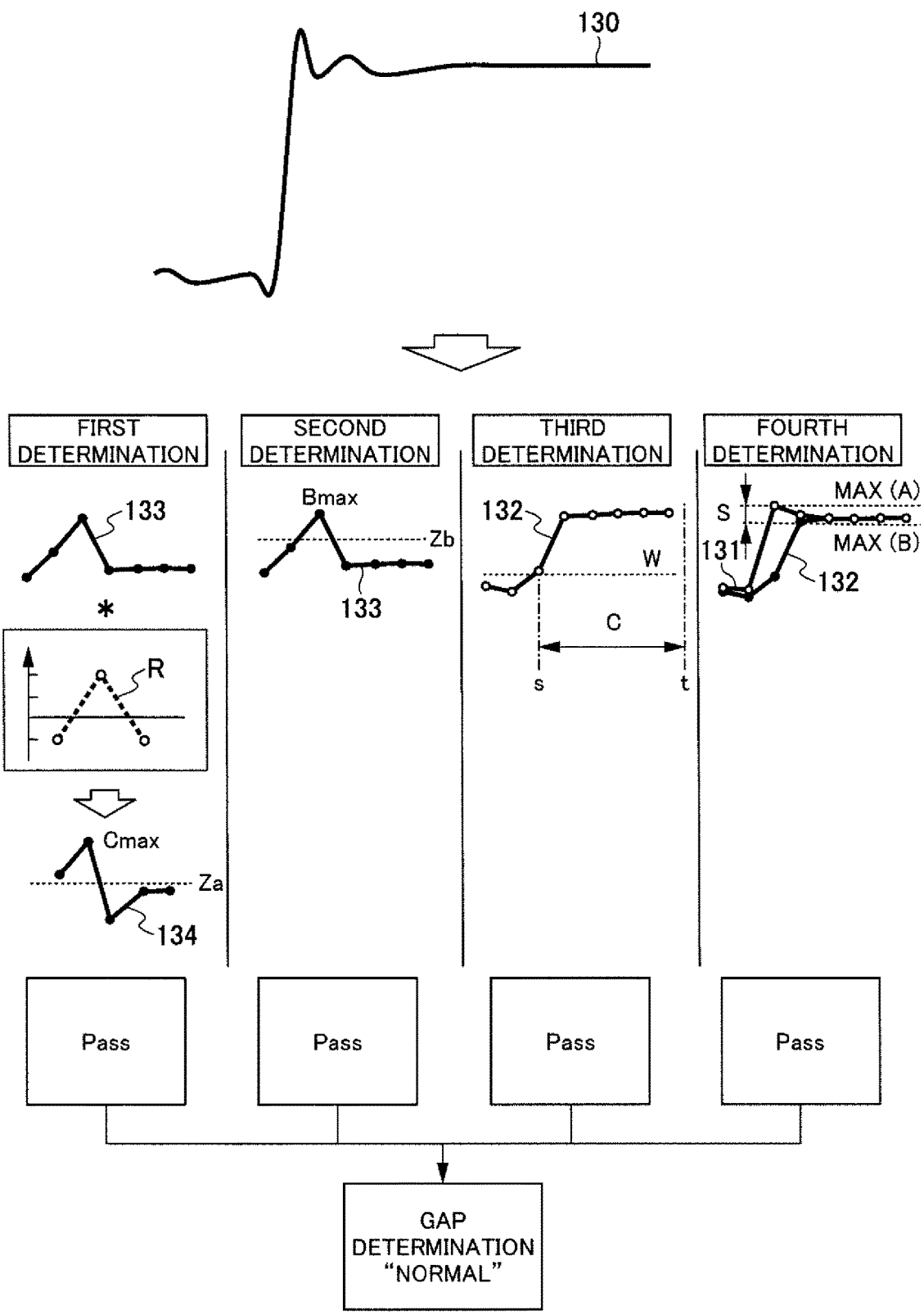
FIG. 17 is a diagram illustrating a determination process (pattern 0) on the normal waveform in FIG. 16.

FIG. 17 is a diagram illustrating a determination process (pattern 0) on the normal waveform in FIG. 16.

As illustrated in FIG. 16, a normal waveform 130 has the following characteristic: the electrostatic capacity value (detected as oscillating frequency from the CR oscillation circuit 4) between the tip portion 1e of the dispensing probe 1a and the surrounding portion increases temporarily; and, after that, the electrostatic capacity value converges on a small width of fluctuation (similarly to the waveform 31 in FIG. 4). The first reason of this is that the difference between the electrostatic capacity value in the air in which the dispensing probe 1a moves downward and the electrostatic capacity value obtained when the tip portion 1e is in contact with the liquid level is large. The second reason of this is that the electrostatic capacity value is stable in a state in which the tip portion 1e is in the air and in a state after the tip portion 1e comes into contact with the liquid level.

Therefore, a derivative-value data series 133 obtained by performing differential calculation on a minimum-value data series 132 forms a spiky waveform, and a cross correlation between the derivative-value data series 133 and the search waveform data R is high. Accordingly, the determination value (the maximum value Cmax of a cross correlation function 134) in the first determination process is high, and the result of the first determination process is "Pass" (normal).

In the second determination process, since the electrostatic capacity value increases temporarily, the maximum value Bmax of the derivative-value data series 133 is high, and the determination result is "Pass".

In the third determination process, after the electrostatic capacity value once exceeds the processing threshold W, the electrostatic capacity value is stable. Accordingly, the section during which the electrostatic capacity value exceeds the processing threshold W is long, or the electrostatic capacity value will not fall below the processing threshold W. Therefore, the determination result is "Pass".

In the fourth determination process, a maximum-value data series 131 and the minimum-value data series 132 increase in synchronization with each other, and, after the increase, stay at almost the same value. Therefore, the difference S between the maximum values MAX(A) and MAX(B) of the two data series is not so high, and the determination result is "Pass".

As described above, all of the determination results in the first to fourth determination processes are "Pass". Therefore, a combination of the four determination results corresponds to pattern 0 in the gap-reason determination table 41 (FIG. 6). Therefore, the result of the gap determination in step S13 in FIG. 5 is "Normal".

First Exemplary Data Processing on an Abnormal Waveform

Figure 18:
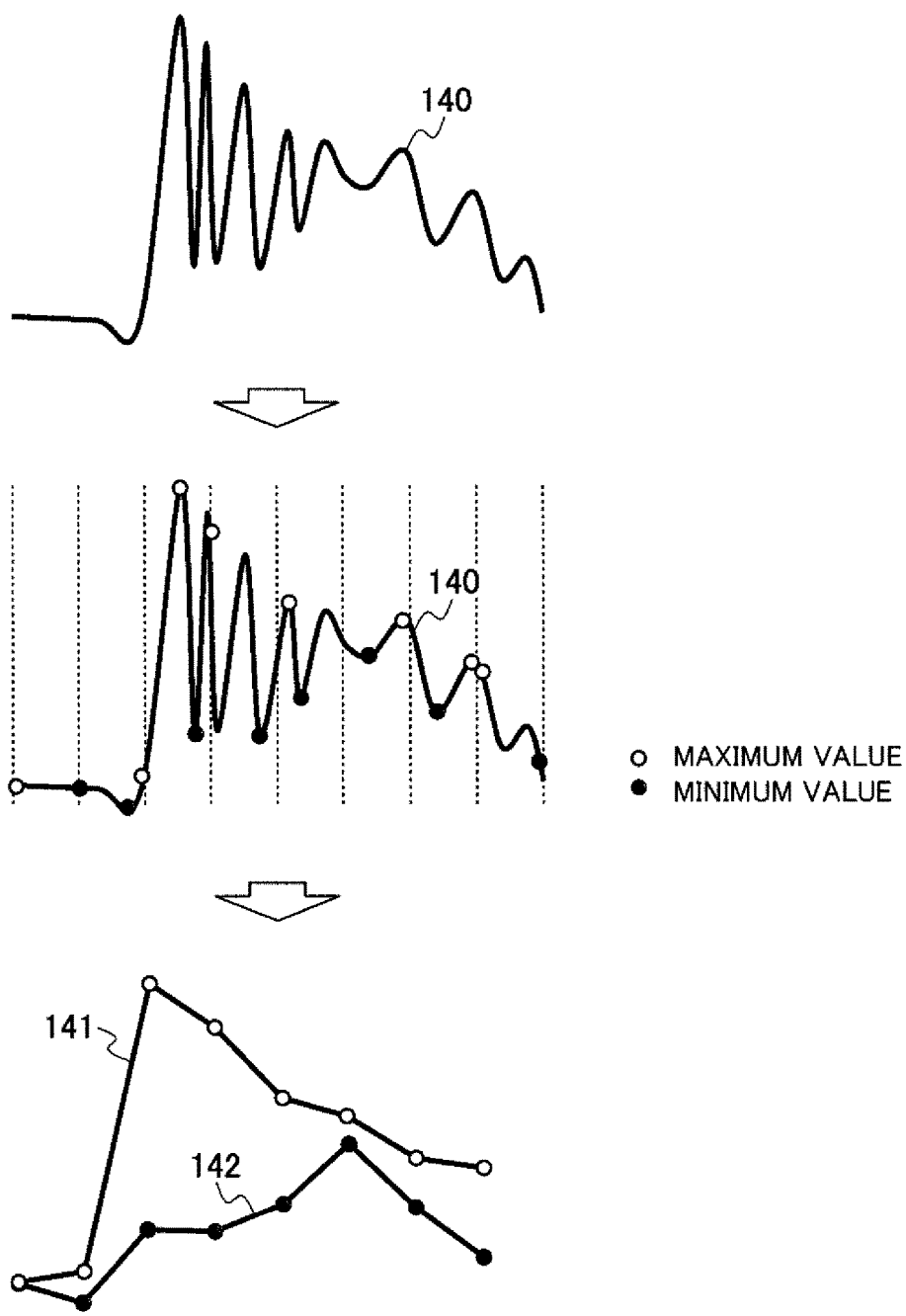
FIG. 18 is a diagram illustrating an abnormal waveform and data processing on the abnormal waveform.

FIG. 18 is a diagram illustrating an abnormal waveform and data processing on the abnormal waveform.

Figure 19:
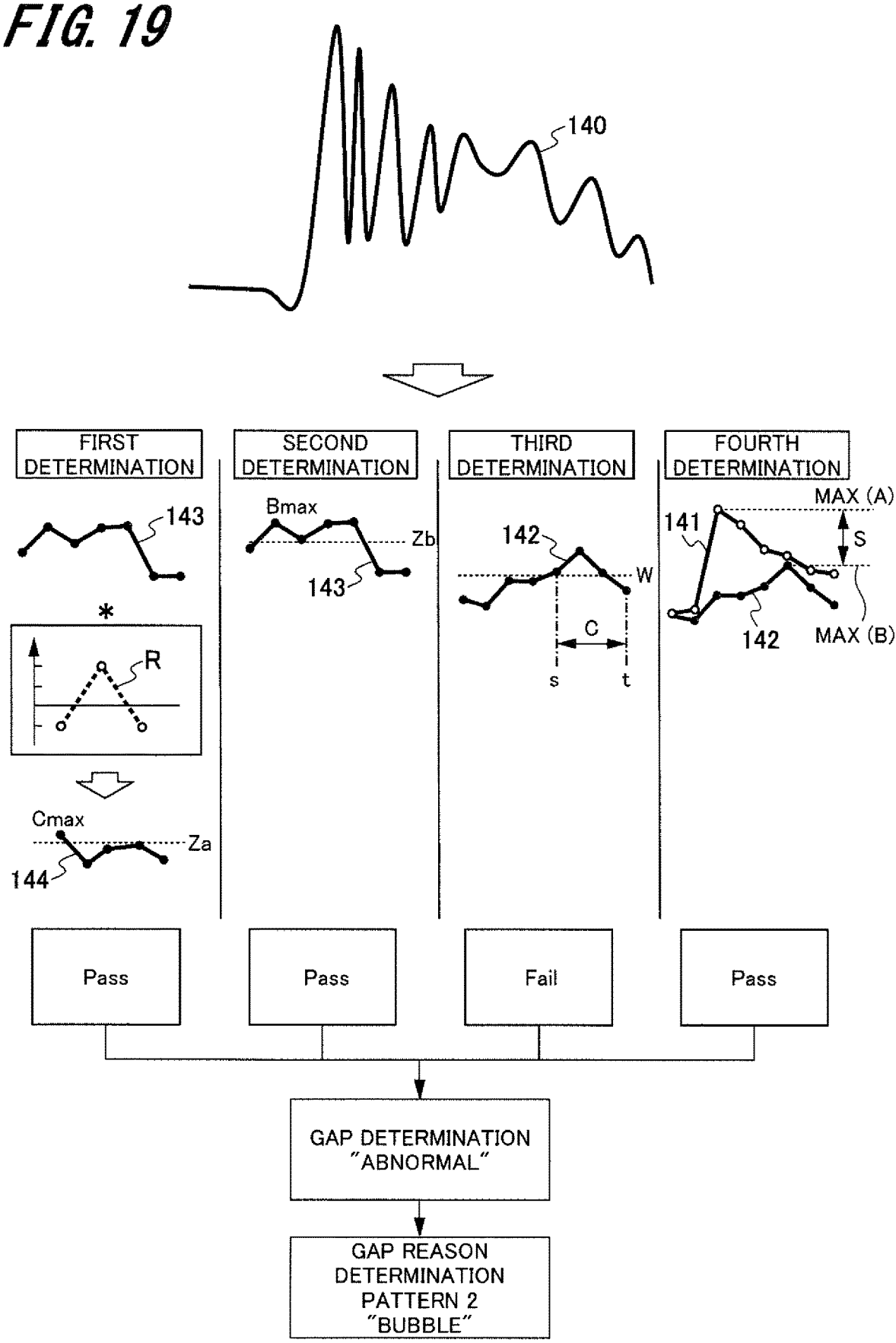
FIG. 19 is a diagram illustrating a determination process (pattern 2) on the abnormal waveform in FIG. 18.

FIG. 19 is a diagram illustrating a determination process (pattern 2) on the abnormal waveform in FIG. 18.

A waveform 140 in FIGS. 18 and 19 is an exemplary waveform obtained when the dispensing probe 1a comes into contact with bubbles on a liquid level and stops. It is known that a biological sample may form bubbles due to its constituent. A clinical test reagent forms bubbles because it contains a surface-active agent.

When the tip portion 1e of the dispensing probe 1a stops in a state in which the tip portion 1e is in contact with the surface of bubbles, vibrations caused by the stop are produced in the dispensing probe 1a, and the bubbles with which the dispensing probe 1a is in contact vibrate in accordance with the vibrations due to the surface tension of the bubbles. At that time, the area in which the dispensing probe 1a is in contact with the bubbles changes continuously. The shape of the bubble also changes continuously.

Typically, a biological sample and a clinical test reagent contain electrolyte constituents. Therefore, a state in which the tip portion 1e of the dispensing probe 1a is in contact with bubbles means that the dispensing probe 1a is in electrical communication with the bubbles. However, continuous change in the area in which the dispensing probe 1a is in contact with bubbles or the shape of the bubbles means that the area of a sample portion that is in electrical communication with the dispensing probe 1a changes through the bubbles continuously. This indicates that the area of the entire conductive material including the dispensing probe 1a changes with respect to the surrounding portion of the dispensing probe 1a, such as the apparatus housing. An electrostatic capacity between two facing conductors changes in accordance with the areas of these conductors. As a result, the electrostatic capacity value (oscillating frequency) increases and decreases at random. Therefore, the waveform 140 obtained when the tip portion 1e of the dispensing probe 1a comes into contact with bubbles and stops is a waveform including noise whose amplitude is very large.

In this case, a spiky waveform tends to be formed in a derivative-value data series 143 (FIG. 19) obtained by performing differential calculation on a minimum-value data series 142. Therefore, a cross correlation between the derivative-value data series 143 and the search waveform data R is high. Accordingly, the determination result (the maximum value Cmax of a cross correlation function 144) in the first determination process is high, and the determination result tends to be "Pass" (normal).

In the second determination process, change in the minimum-value data series 142 is large. Therefore, a large value tends to be present in the derivative-value data series 143 (the maximum value Bmax), and the determination result tends to be "Pass".

In the third determination process, change in the minimum-value data series 142 has occurred in a short period (section C). Therefore, the section C from a time point at which the point first exceeds the threshold W till a time point at which the point falls below the threshold W is short. The determination result is "Fail" (abnormal).

In the fourth determination process, since change in the waveform 140 is large, the maximum value MAX(B) of the minimum-value data series 142 is large. Therefore, the difference S between the maximum value MAX(A) of a maximum-value data series 141 and the maximum value MAX(B) of the minimum-value data series 142 is not large, and the determination result is "Pass".

In the case of the exemplary waveform 140 caused by bubbles, a combination of the four determination results corresponds to pattern 2 in the gap-reason determination table 41. Therefore, the result of the gap determination in step S13 in FIG. 5 is "ABNORMAL", and the result of the gap reason determination in step S16 is "BUBBLE".

As described above, in the first embodiment, waveform data obtained by monitoring change in the electrostatic capacity is used. It is determined whether or not a gap from a liquid level due to bubbles is present from the characteristics of the waveform. Thus, more accurate determination than that in the related art is achieved.

Second Exemplary Data Processing on an Abnormal Waveform

FIG. 20 is a diagram for describing an abnormal waveform and data processing on the abnormal waveform.

Figure 21:
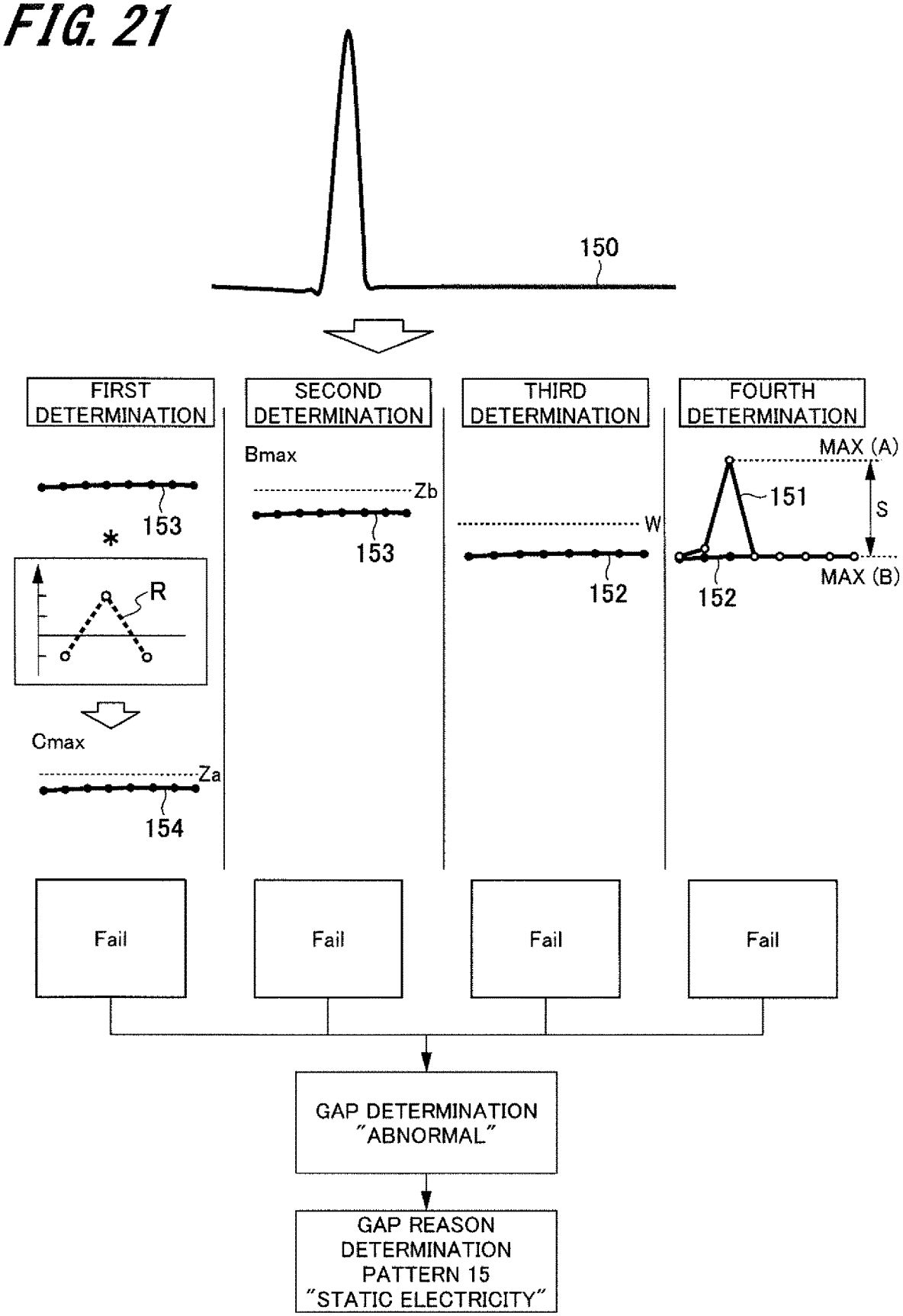
FIG. 21 is a diagram illustrating a determination process (pattern 15) on the abnormal waveform in FIG. 20.

FIG. 21 is a diagram illustrating a determination process (pattern 15) on the abnormal waveform in FIG. 20.

A waveform 150 in FIGS. 20 and 21 is an exemplary waveform obtained when the tip portion 1e of the dispensing probe 1a receives a flow of static electricity (electric charge) from the surrounding portion. In this case, a temporary flow of static electricity causes the electrostatic capacity value to increase in a very short period, and the moving-downward operation of the dispensing probe 1a is also stopped. The static electricity rapidly diffuses after the static electricity flows into the dispensing probe 1a, and the electrostatic capacity value decreases to the same level as that obtained when the dispensing probe 1a is in the air before the dispensing probe 1a moves downward. That is, the waveform 150 obtained when the static electricity flows in forms like a spike.

At that time, if the time regions that are obtained through division and that are used to generate a maximum-value data series 151 and a minimum-value data series 152 are large enough for the spiky waveform, even in a time region in which the spike is included as illustrated in FIG. 20, the minimum value is equivalent to the minimum values in the other time regions. That is, a waveform is obtained in which, while the value of the maximum-value data series 151 increases temporarily, the value of the minimum-value data series 152 is substantially constant. A time region that is obtained through division and that produces such a processing result needs to be long enough for a period from a time point of a flow of electric charge till a time point of diffusion of the electric charge. Past experience indicates that a time region, which is obtained through division, of about 0.5 milliseconds or longer is enough.

In the first determination process, a derivative-value data series 153 which is obtained by performing differential calculation on the minimum-value data series 152 is maintained at substantially the same value to the final point. Therefore, there is no matching portion between the derivative-value data series 153 and the spiky search waveform data R. The minimum value Cmax of a cross correlation function 154 is small, and the determination result is "Fail".

In the second determination process, the derivative-value data series 153 is maintained at a low value till the final point. Therefore, the maximum value Bmax of the derivative values is small, and the determination result is "Fail".

In the third determination process, the values of the points in the minimum-value data series 152 never exceed the threshold W. Therefore, the determination result is "Fail".

In the fourth determination process, while the maximum value MAX(A) is large because the value of the maximum-value data series 151 increases temporarily, the maximum value MAX(B) is small because all of the values in the minimum-value data series 152 are small. Therefore, the difference S between the maximum values MAX(A) and MAX(B) of the two data series is large, and the determination result is "Fail".

In the case of the exemplary waveform 150 caused by static electricity, a combination of the four determination results corresponds to pattern 15 in the gap-reason determination table 41. Therefore, the result of the gap determination in step S13 in FIG. 5 is "ABNORMAL", and the gap reason in step S16 is "STATIC ELECTRICITY".

As described above, in the first embodiment, waveform data obtained by monitoring change in the electrostatic capacity is used. It is determined whether or not a gap from a liquid level due to static electricity has occurred, from the characteristics of the waveform. Thus, more accurate determination than that in the related art is achieved.

Third Data Processing on an Abnormal Waveform

Figure 22:
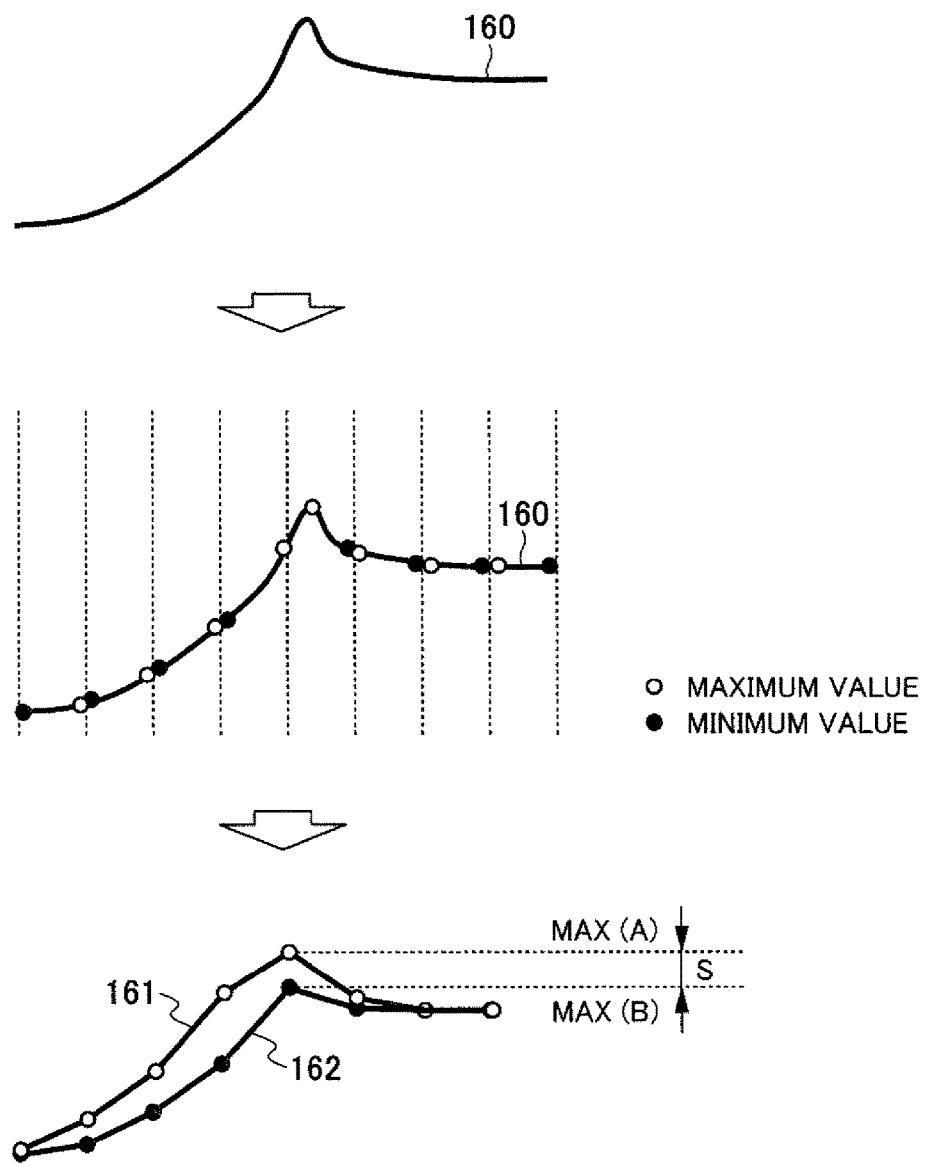
FIG. 22 is a diagram for describing an abnormal waveform and data processing on the abnormal waveform.

FIG. 22 is a diagram for describing an abnormal waveform and data processing on the abnormal waveform.

Figure 23:
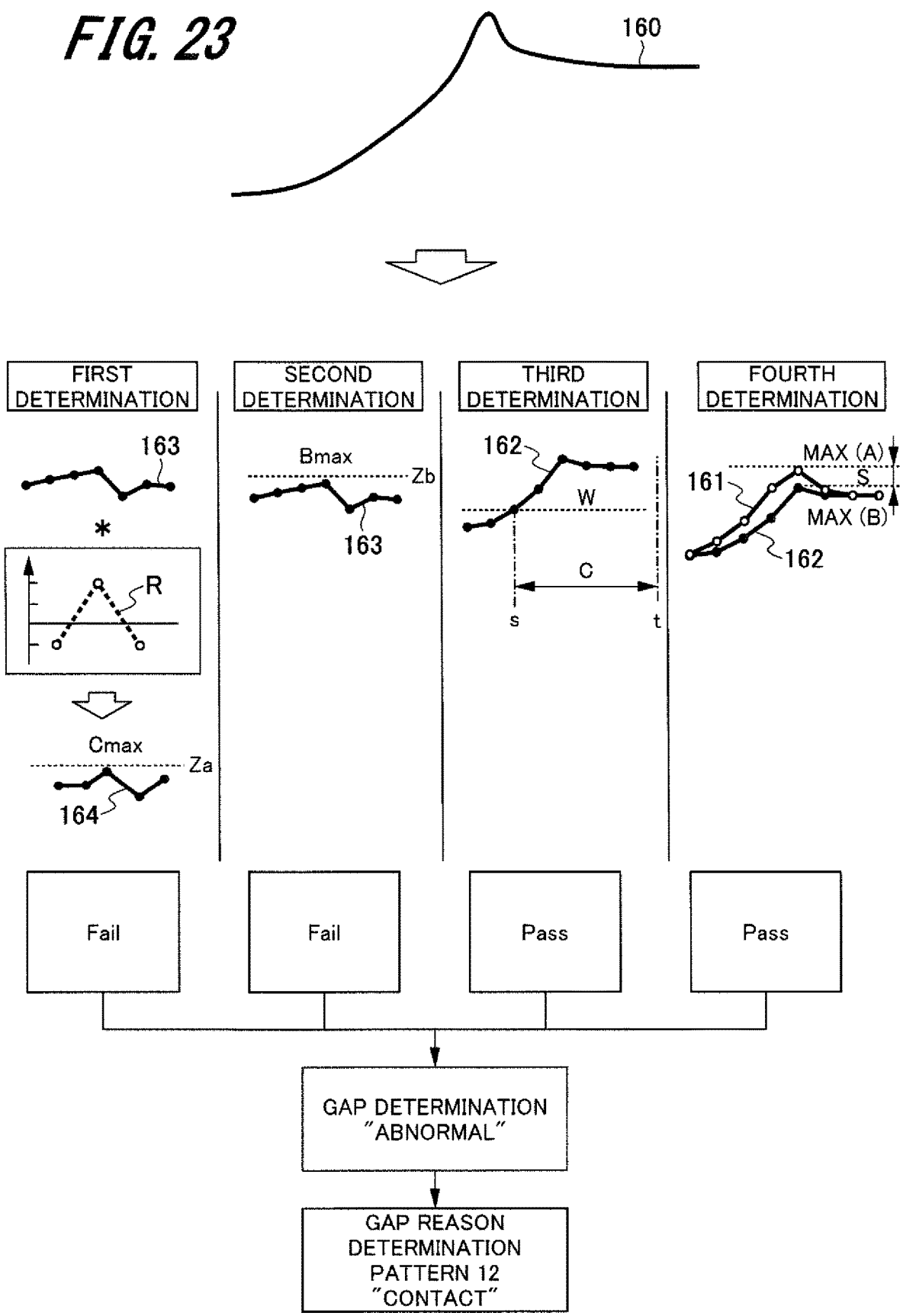
FIG. 23 is a diagram illustrating a determination process (pattern 12) on the abnormal waveform in FIG. 22.

FIG. 23 is a diagram illustrating a determination process (pattern 12) on the abnormal waveform in FIG. 22.

A waveform 160 in FIGS. 17 and 18 is an exemplary waveform obtained when the tip portion 1e of the dispensing probe 1a comes into contact with the container 2 before the tip portion 1e touches the liquid level of a sample. A reason of the contact may be improper setting of the container 2 on a container tray (such as a turntable), an insufficient fluid volume of the sample 3, or the like. When the contact occurs, as illustrated in the waveform 160, the electrostatic capacity value increases to about the threshold used by the detection unit 51 (FIG. 1) detecting a liquid level, and then decreases gently.

Typically, in an automatic analyzer, both of a conductive part such as metal and an insulating part such as resin are used. Metal is selected due to its robustness, workability, and the like, and is often used especially in a base portion of the housing in which units are mounted. The dispensing unit 1 is disposed on a metal base. Therefore, from a comprehensive point of view, it may be understood that a moving-downward operation of the dispensing probe 1a is an operation of moving the dispensing probe 1a downward to a metal plate. The electrostatic capacity is obtained by using the voltage between two conductors and the amount of electric charge accumulated between the conductors. When the amount of electric charge is constant, if the distance between the conductors becomes shorter, the electrostatic capacity increases. That is, simply, a moving-downward operation of the dispensing probe 1a causes the electrostatic capacity between the tip portion 1e and the surrounding portion to increase.

It is known that the electrostatic capacity between parallel plate conductors is inversely proportional to the distance. Even in the case of another object other than a parallel plate, the electrostatic capacity between two conductors has the same tendency. Therefore, the electrostatic capacity obtained when the dispensing probe 1a is moving downward increases gently as long as the distance between the dispensing probe 1a and the surrounding portion such as an apparatus housing is sufficiently long. The rate of the increase is relatively very small compared with the rate of increase obtained when the tip portion 1e of the dispensing probe 1a comes into contact with a liquid sample.

Typically, the threshold for electrostatic capacity for determining whether or not the dispensing probe 1a is to stop is set to a value that is sufficiently large compared with the rate of increase that is produced naturally during a moving-downward operation. However, if the inside of the container 2 is wet with a conductive sample, the dispensing probe 1a is in substantially the same state in which the dispensing probe 1a approaches a conductive thin film disposed at a very short distance. That is, the rate of increase in the electrostatic capacity is slightly larger than that produced when the container 2 is not set on a container tray.

When the tip portion 1e of the dispensing probe 1a touches the interior wall of the container 2, the electrostatic capacity increases slightly. At that time, when the amount of the increase in the electrostatic capacity exceeds the increase threshold for electrostatic capacity which is used by the detection unit 51 detecting a liquid level, the dispensing probe 1a stops. It is known that the amount of the increase in the electrostatic capacity is small compared with a case in which the dispensing probe 1a touches a liquid sample. To avoid erroneous detection due to the tip portion 1e being in contact with the interior wall of the container 2, a measure of increasing the threshold may be taken. In this case, presence of a nonconductive sample such as water may cause a problem.

When the tip portion 1e of the dispensing probe 1a comes into contact with the liquid level of a nonconductive sample, the electrostatic capacity increases slightly. Therefore, the threshold used in detection needs to be set small. It is found, from experiments, that an increase in the electrostatic capacity which is obtained when the tip portion 1e of the dispensing probe 1a touches a nonconductive sample is not so different from an increase in the electrostatic capacity which is produced when the tip portion 1e comes into contact with the interior wall that is wet with a conductive sample. Therefore, it is difficult to differentiate the two cases from each other by using the detection threshold. However, when the liquid level of a nonconductive sample is to be detected, an increase in the electrostatic capacity obtained when the dispensing probe 1a comes near in the air is not different from an increase in the electrostatic capacity obtained when the container 2 (for example, a blood-collecting vessel) is not present. That is, when the tip portion 1e of the dispensing probe 1a comes into contact with the liquid level of a nonconductive sample, the electrostatic capacity increases instantaneously to a large extent.

In contrast, in the case of contact with the container 2 whose interior wall is wet with a conductive sample, as described above, the rate of increase in the electrostatic capacity in the air is rather large, and the rate itself of increase in the electrostatic capacity which is obtained at a moment of the contact is gentle compared with that obtained in the case of contact with water. When the dispensing probe 1a touches the container 2 whose interior wall is wet with a nonconductive sample such as water, the electrostatic capacity is hardly affected. Therefore, the dispensing probe 1a does not stop, and continues to move downward.

Typically, if the dispensing probe 1a does not stop, a collision detection sensor employing a system of detecting a state in which the dispensing probe 1a detaches from any object (fixed part) may be used to detect abnormality. However, when the interior wall of the container 2 is wet with a conductive sample, the dispensing probe 1a stops at a moment at which the tip portion 1e of the dispensing probe 1a touches the interior wall of the container 2. Therefore, such a collision detection sensor is not effective.

In the first determination process, since the value of a minimum-value data series 162 increases gently, the rate of change in a derivative-value data series 163 is also small. Therefore, the data series 163 does not match the spiky search waveform data R, and the maximum value Cmax of a cross correlation function 164 is also below the threshold Za. Therefore, the determination result tends to be "Fail" (abnormal).

In the second determination process, since the value of the minimum-value data series 162 increases gently, the derivative-value data series 163 (the maximum value Bmax) is unlikely to have a large value, and the determination result tends to be "Fail".

In the third determination process, the value of the minimum-value data series 162 is stable after increase. In addition, the electrostatic capacity value never falls below the processing threshold W after it once exceeds the processing threshold W. Therefore, the determination result is "Pass" (normal).

In the fourth determination process, the value of the minimum-value data series 162 is stable after increase. Therefore, the difference S between the maximum values MAX(A) and MAX(B) of the two data series of a maximum-value data series 161 and the minimum-value data series 162 is not so large. Therefore, the determination result is "Pass".

In the case of the exemplary waveform 160 obtained due to contact, a combination of the four determination results corresponds to pattern 12 in the gap-reason determination table 41. Therefore, the result of the gap determination in step S13 in FIG. 5 is "ABNORMAL". The result of the gap reason determination in step S16 is "CONTACT".

As described above, in the first embodiment, waveform data obtained by monitoring change in the electrostatic capacity is used to determine whether or not a gap from a liquid level is present due to a state in which the dispensing probe 1a comes into contact with the interior wall of the container 2 which is wet with conductive liquid, from the characteristics of the waveform. Thus, a case of erroneous detection of a liquid level due to contact with the container interior wall, which is not covered in the related art, may be determined.

Effects of the Embodiment

According to the above-described embodiment, for erroneous detection of a liquid level using an electrostatic capacity system, it may be determined that the detection result is erroneous, on the basis of a combination of four determination results. That is, when the detection unit 51 detects a liquid level regardless of a state in which the tip portion 1e of the dispensing probe 1a has not come into contact with the liquid level (a gap from the liquid level), it may be determined that the detection result is erroneous with high accuracy.

According to the embodiment, in the case of erroneous detection of a liquid level, it may be presumed, with high probability, which reason, "BUBBLE", "STATIC ELECTRICITY", "CONTACT", or "UNKNOWN", has caused a gap from the liquid level, by combining determination results of the four determination processes.

According to the embodiment, information about occurrence of erroneous detection of a liquid level (a gap from the liquid level) is output to the display unit so as to be notified to a user. Thus, an erroneous constituent concentration of a sample may be prevented from being reported. The user may grasp that the analysis result of the sample is obtained from measurement performed in a state in which the dispensing probe 1a does not suction the sample properly.

Further, according to the embodiment, a reason of the erroneous detection of a liquid level and information (recommended coping procedure) about what is to be performed on the sample or the like are output on the display unit. Thus, a user may take a measure of high probability first as a measure against the reason of the erroneous detection. Therefore, time in which the user copes with the reason of the erroneous detection may be reduced. This leads to reduction in time until the sample for which an abnormal result is obtained is tested again. That is, the reason of the erroneous detection may be removed from the automatic analyzer 10 in a short period and the operation may be restarted, achieving high customer convenience.

In addition, according to the embodiment, the storage unit 6 stores alternating current signal data that is based on the electrostatic capacity between the tip portion 1e of the dispensing probe 1a and the surrounding portion and that is output from an oscillation circuit (for example, the CR oscillation circuit 4) used in an electrostatic capacity system. The oscillating frequency (waveform) is analyzed on the basis of the alternating current signal data stored in the storage unit 6. Therefore, it is not necessary to change a circuit (for example, the first processor 5) for calculating the electrostatic capacity value. An arithmetic processor (the second processor 7), which is additionally provided, may be used to make the determination. As the second processor 7, an operation console such as a personal computer (PC) may be used. This means that a condition such as a software threshold is easily changed, achieving flexibility in the automatic analyzer 10 according to the embodiment. Therefore, the automatic analyzer 10 is practically useful.

In addition, according to the embodiment, the second processor 7 and the second controller 8 are simply added to an existing electrostatic-capacity automatic analyzer, enabling erroneous detection of a liquid level to be determined with high accuracy. For example, when the second processor 7 and the second controller 8 are implemented as software, the functions according to the embodiment may be easily added to an existing automatic analyzer.

The method in which it is determined whether a gap is present and which is performed by the first gap-determination processor 72A to the fourth gap-determination processor 72D of the second processor 7 may be implemented by using very simple computational expressions (for example, Expressions 1 to 3), achieving light processing load and short calculation time.

Other Embodiments

In the above-described first embodiment, the gap determination and the gap reason determination in FIG. 5 are made on the basis of a combination of four determination results obtained from the first gap-determination processor 72A (first determination process) to the fourth gap-determination processor 72D (fourth determination process). However, the gap determination and the gap reason determination may be made on the basis of a combination of two or more determination results among the four determination results.

For example, in accordance with reasons of a gap which are to be determined, a combination to be used may be determined among the first to fourth determination processes. For example, bubbles and static electricity are characteristic as a reason. Therefore, a combination of the third and fourth determination processes may be used to make determination. Alternatively, by combining the third and fourth determination processes with another determination process, the gap determination and the gap reason determination may be made. When a combination of determination processes (determination results) to be used is changed, the gap-reason determination table 41 is changed in accordance with the combination.

Both of the first and second determination processes perform differential calculation, and make determination on the basis of a derivative-value data series. Thus, some processes in the first determination process are similar to those in the second determination process. Therefore, either one may be used, or both may be integrated.

The third determination process has a different course from the first, second, and fourth determination processes in that the shape of an electrostatic capacity waveform is checked from the viewpoint of a time width that is equal to or larger than a certain period and that corresponds to the threshold W. Accordingly, it is desirable that a combination of determination results include at least a determination result from the third determination process. Thus, a variety of combinations are achieved, and accuracy for a gap reason is improved.

In the above-described first embodiment, instead of extracting, as a feature value, the minimum value for each group (regular section) having a certain number of points in a time-series data of the electrostatic capacity values (detected as oscillating frequency data), the average or the maximum value may be extracted.

In the above-described first embodiment, in extraction of a feature value for each group having a certain number of points, the points are not necessarily obtained at regular time intervals. That is, assume employment of a method in which the minimum value or the like is extracted for each group having a certain number of points or each time region having a certain width, from data obtained through sampling at variable, proper time intervals. Even in this case, the same detection performance is fundamentally obtained (that is, no influence on the determination result).

In the above-described first embodiment, when a user is notified of a determination result of erroneous detection of a liquid level, for example, an alarm may be sounded by using a speaker, an alert message may be displayed on a screen, or a mark may be added to a measurement result on a screen.

Further, the present invention is not limited to the above-described exemplary embodiments. As a matter of course, without departing from the gist of the present invention which is described in the scope of claims, other various exemplary applications and exemplary modifications may be made.

For example, the above-described exemplary embodiments are such that, in order to describe the present invention clearly, the configurations of apparatuses and systems are specifically described in detail. The present invention is not necessarily limited to an embodiment including all of the configurations described above. In addition, a part of the configuration according to an exemplary embodiment may be replaced with the configuration of another embodiment. Further, to the configuration of an exemplary embodiment, the configuration of another exemplary embodiment may be added. A part of the configuration of each exemplary embodiment may be subjected to addition with another configuration, deletion, or replacement.

Some or all of the configurations, the functions, the functional units, the processors, and the like described above may be implemented as hardware, for example, through design using integrated circuits. In addition, the configurations, the functions, and the like described above may be implemented as software by a processor interpreting, for execution, programs for implementing the respective functions. Information, such as programs, tables, and files, for implementing the functions may be stored in a recording device, such as a memory, a hard disk, or a solid state drive (SSD), or a recording medium, such as an integrated circuit (IC) card, a secure digital (SD) card, or a digital versatile disk (DVD).

The control lines and the information lines which may be necessary are illustrated. All of the control lines and the information lines which are necessary for a product are not necessarily illustrated. Actually, almost all the configurations may be connected to one another.

In the specification, processing steps for describing time-series processes include not only processes performed in a time-series manner in the described order but also processes (for example, parallel processing or processing using objects) that are not necessarily performed in a time-series manner and that are performed in parallel or individually.

What is claimed is:

1. An automatic analyzer, comprising:
a dispenser comprising a dispensing probe, the dispenser configured to move a tip portion of the dispensing probe to a liquid level in a container to suction and eject liquid;
an oscillation circuit that is connected to the dispensing probe, the oscillation circuit programmed or configured to output an alternating current signal indicating oscillating frequency according to an electrostatic capacity, the electrostatic capacity being produced between the tip portion of the dispensing probe and a surrounding portion associated with the dispensing probe;
a first processor in communication with the dispenser and the oscillation circuit and programmed or configured to:
detect a detection result comprising whether or not the tip portion of the dispensing probe comes into contact with the liquid level in the container, on the basis of the oscillating frequency of the alternating current signal which is output from the oscillation circuit; and
output a control signal to the dispenser to control an operation of the dispenser based on the detection result;
a second processor in communication with the oscillation circuit and programmed or configured to:
extract feature values from time-series oscillating frequency data of the alternating current signal, the alternating current signal being output by the oscillation circuit in a period from a time point at which the dispensing probe starts moving downward to a time point at which a certain period of time has elapsed;
determine a plurality of determination results comprising whether or not the liquid level in the container is detected properly by the first processor, on the basis of the extracted feature values; and
output the plurality of determination results to a second controller; and the second controller in communication with the second processor and programmed or configured to determine, on the basis of the plurality of determination results, a final determination result comprising whether a gap is present and a reason for the gap, the gap being present between the tip portion of the dispensing probe and the liquid level in the container.

2. The automatic analyzer according to claim 1,
wherein the plurality of determination results are determined by at least one processor programmed or configured to:
determine a first result, comprising:
determining a derivative value of a feature value in each regular section of the time-series oscillating frequency data, and
determining a cross correlation between a waveform of a data series of the derivative values and a corresponding normal waveform,
determine whether or not the liquid level is detected properly from the first result,
determine a second result, comprising:
determining the derivative value of the feature value in each regular section of the time-series oscillating frequency data, and
comparing a maximum value of the data series of the derivative values with a threshold,
determine whether or not the liquid level is detected properly from the second result,
determine a third result, comprising:
determining a section in which the feature value in each regular section satisfies a given condition, the feature value being extracted from the time-series oscillating frequency data, and
comparing the length of the section with a threshold,
determine whether or not the liquid level is detected properly from the third result, and
determine a fourth result, comprising:
determining a maximum value of a maximum-value data series and a maximum value of a minimum-value data series, the maximum-value data series including maximum values, each of the maximum values being extracted as the feature value in a corresponding one of the regular sections from the time-series oscillating frequency data, the minimum-value data series including minimum values, each of the minimum values being extracted as the feature value in a corresponding one of the regular sections from the time-series oscillating frequency data, and
comparing a difference between the maximum value of the maximum-value data series and the maximum value of the minimum-value data series with a threshold,
determine whether or not the liquid level is detected properly from the fourth result,
wherein the second controller is programmed or configured to determine whether a gap is present and a reason for the gap from a combination of two or more of the plurality of determination results.

3. The automatic analyzer according to claim 2,
wherein the extracted feature values indicate a minimum value and/or a maximum value in each regular section of the time-series oscillating frequency data.

4. The automatic analyzer according to claim 2,
wherein the second controller is programmed or configured to determine whether the reason for the gap is a bubble formed on the liquid level, contact between the tip portion of the dispensing probe and an interior wall of the container, static electricity, or unknown.

5. The automatic analyzer according to claim 1, wherein the second controller is programmed or configured to communicate the final determination result to a display unit to cause the display unit to display the final determination result.

6. A computer-readable recording medium storing a program for causing a computer to execute a process comprising:

outputting, by using an oscillation circuit, an alternating current signal indicating oscillating frequency according to an electrostatic capacity, the electrostatic capacity being produced between a tip portion of a dispensing probe and a surrounding portion associated with the dispensing probe, the oscillation circuit being connected to the dispensing probe, the dispensing probe moving to a liquid level in a container and suctioning and ejecting liquid in the container;

extracting feature values from time-series oscillating frequency data of the alternating current signal, the alternating current signal being output by the oscillation circuit in a period from a time point at which the dispensing probe starts moving downward until a time point at which a certain period of time has elapsed;

determining a plurality of determination results comprising whether or not the liquid level in the container is detected properly on the basis of the extracted feature values of the time-series oscillating frequency data by using a plurality of different methods; and determining whether a gap is present and a reason for the gap from a combination of the plurality of determination results obtained by using the plurality of methods, the gap being present between the tip portion of the dispensing probe and the liquid level in the container.

* * * * *